(12) United States Patent
Matsumura et al.

(10) Patent No.: US 7,579,384 B2
(45) Date of Patent: Aug. 25, 2009

(54) EXPANDED MOLDED ARTICLE HAVING VOIDS

(75) Inventors: Hideyasu Matsumura, Shiga (JP); Tatsuya Matsugashita, Nara (JP)

(73) Assignee: Sekisui Plastics Co., Ltd., Osaka (JP)

( * ) Notice: Subject to any disclaimer, the term of this patent is extended or adjusted under 35 U.S.C. 154(b) by 0 days.

(21) Appl. No.: 11/659,463

(22) PCT Filed: Sep. 20, 2005

(86) PCT No.: PCT/JP2005/017673

§ 371 (c)(1), (2), (4) Date: Feb. 6, 2007

(87) PCT Pub. No.: WO2006/033449

PCT Pub. Date: Mar. 30, 2006

(65) Prior Publication Data

US 2007/0287003 A1    Dec. 13, 2007

(30) Foreign Application Priority Data

Sep. 22, 2004    (JP) ............................. 2004-275278

(51) Int. Cl.
*C08J 9/18*    (2006.01)
*B32B 3/26*    (2006.01)

(52) U.S. Cl. ............................. 521/56; 521/59; 521/60; 521/139; 521/142; 428/304.4; 428/315.5; 428/315.7

(58) Field of Classification Search .............. 428/304.4, 428/315.5, 315.7; 521/56, 59, 60, 139, 142
See application file for complete search history.

(56) References Cited

U.S. PATENT DOCUMENTS

2003/0187142 A1    10/2003    Hellums (Continued)

FOREIGN PATENT DOCUMENTS

EP    0453999    10/1991

(Continued)

OTHER PUBLICATIONS

Translation of JP 07-278341 ,"Pre-Expanded Bead of Uncrosslinked Linear-Chain Low Density Polyethylene Resin and Its Production", Takeda et al, Oct. 24, 1995.*

(Continued)

*Primary Examiner*—Hai Vo
(74) *Attorney, Agent, or Firm*—Greenblum & Bernstein, P.L.C.

(57) ABSTRACT

An expanded molded article having a void percentage of 5 to 50%, the molded article comprising 50 to 800 parts by weight of styrene-based resin relative to 100 parts by weight of non-crosslinked linear low-density polyethylene-based resin which can be obtained by using a metallocene catalyst, wherein the molded article is obtained by impregnating styrene-modified linear low-density polyethylene-based resin beads with a volatile blowing agent to provide expandable beads, pre-expanding the expandable beads and then subjecting the obtained pre-expanded beads to expansion molding, the styrene-modified linear low-density polyethylene-based resin beads each have the styrene-based resin dispersed in the form of particles, and a diameter of particle is 0.8 μm or smaller in a surface region within at least 5 μm from the bead surface and in a center region within a 5 μm radius from the bead center.

2 Claims, 12 Drawing Sheets

U.S. PATENT DOCUMENTS

| | | | |
|---|---|---|---|
| 2006/0058406 A1* | 3/2006 | Matsumura et al. | 521/142 |
| 2006/0063847 A1* | 3/2006 | Matsumura et al. | 521/82 |
| 2006/0217452 A1* | 9/2006 | Inada et al. | 521/142 |
| 2007/0243365 A1* | 10/2007 | Matsumura et al. | 428/220 |
| 2007/0249784 A1* | 10/2007 | Matsumura et al. | 524/856 |

FOREIGN PATENT DOCUMENTS

| | | |
|---|---|---|
| GB | 1431120 | 4/1976 |
| JP | 51-46138 | 12/1976 |
| JP | 52-10150 | 3/1977 |
| JP | 62-59642 | 3/1987 |
| JP | 7-80873 | 3/1995 |
| JP | 58-53003 | 3/2003 |
| WO | WO 2004085528 A1 * | 10/2004 |

OTHER PUBLICATIONS

Translation of JP 07-080873, "Styrene-Modified Polyolefin-Based Resin Foam-Molded Body", Endo et al, Mar. 28, 1995.*

English Language Abstract of JP 62-59642., Mar. 16, 1987.

English Language Abstract of JP 7-80873., Mar. 28, 1995.

U.S. Appl. No. 11/659,469 (Matsumura et al.), filed Feb. 6, 2007 and entitled, "Styrene-Modified Polyethylene-Resin Beads, Styrene-Modified Polyethylene-Based Expandable Resin Beads, Production Method therefore, Pre-Expanded Beads and Expanded Molded Article".

U.S. Appl. No. 11/659,466 (Matsumura et al.), filed Feb. 6, 2007 and entitled, "Styrene-Modified Linear Low-Density Polyethylene-Resin Beads, Styrene-Modified Linear Low-Density Polyethylene-Based Expandable Resin Beads, Production Method therefore, Pre-Expanded Beads and Expanded Molded Article".

* cited by examiner

EXPANDED MOLDED ARTICLE HAVING VOIDS

TECHNICAL FIELD

The present invention relates to an expanded molded article having voids. More particularly, the present invention relates to a void-containing expanded molded article which is excellent in heat insulation, lightweight properties and sound absorption and has significantly improved chemical resistance and bending strength. The expanded molded article of the present invention can suitably be used as for example, ceiling materials, materials for automobile interiors such as side impact pads, energy absorbing materials (tibia pads) for lower limbs and floor spacers which protect passengers at collision, automobile parts such as bumpers and construction parts such as wall and floor materials which particularly need to have sound absorption properties.

BACKGROUND ART

A polyethylene-based resin foam is generally used as a packing material owing to its high elasticity and excellent impact resistance. The polyethylene-based resin foam, however, has weakness that its stiffness and compressive strength are low. On the other hand, a styrene-based resin foam is excellent in stiffness, but has a weakness that it is brittle.

To overcome such weakness, Japanese Examined Patent Publication No. SHO 51(1976)-46138 (Patent Document 1), Japanese Examined Patent Publication No. SHO 52(1977)-10150 (Patent Document 2), Japanese Examined Patent Publication No. SHO 58(1983)-53003 (Patent Document 3) and Japanese Unexamined Patent Publication No. SHO 62(1987)-59642 (Patent Document 4) disclose methods in which polyethylene-based resin is impregnated with a styrene-based monomer and polymerization is performed to obtain styrene-modified polyethylene-based resin expandable beads.

As an expanded molded article that can be obtained by heat expanding small particles of styrene-modified polyethylene-based resin foam in a mold and fusing the particles together, Japanese Unexamined Patent Publication No. HEI 7(1995)-80873 (Patent Document 5) discloses an expanded molded article of styrene-modified polyolefin-based resin in which small particles are fused together so as to have 10% to 40% voids among themselves.

[Patent Document 1] Japanese Examined Patent Publication No. SHO 51(1976)-46138

[Patent Document 2] Japanese Examined Patent Publication No. SHO 52(1977)-10150

[Patent Document 3] Japanese Examined Patent Publication No. SHO 58(1983)-53003

[Patent Document 4] Japanese Unexamined Patent Publication No. SHO 62(1987)-59642

[Patent Document 5] Japanese Unexamined Patent Publication No. HEI 7(1995)-80873

DISCLOSURE OF INVENTION

Problems that the Invention is to Solve

In a method disclosed in Japanese. Examined Patent Publication No. SHO 51(1976)-46138, an inorganic nucleating agent is not used in polyethylene-based resin. This makes it difficult to disperse styrene-based resin in particulate form in the polyethylene-based resin near surface regions of the obtained modified resin beads, and thereby the beads tend to show insufficient chemical resistance. Even if the inorganic nucleating agent is used in the polyethylene-based resin, the styrene-based resin dispersed in the polyethylene-based resin takes a form of particles having a size greater than 1 μm near the surface regions of the beads, and thereby the beads tend to show insufficient chemical resistance, because the polymerization of the styrene-based monomer is usually carried out at around 90° C.

The expanded molded article disclosed in Japanese Unexamined Patent Publication No. HEI 7(1995)-80873 is described to have compressive strength adequate to bear the use as material for underdrainage and stably achieve a desired void percentage. The expanded molded articles having such a void percentage can also show excellent sound absorption.

However, the inventors of the present invention have found that such an expanded molded article having a desired void percentage can not bear the use as industrial products including materials for automobile interiors due to insufficiency in, for example, bending strength and the like.

Means of Solving the Problems

The present invention has been made to solve the above problems and it provides an expanded molded article having such a desired void percentage so as to show excellent sound absorption as well as high bending strength.

According to one aspect of the present invention, there is provided an expanded molded article having a void percentage of 5 to 50%, the molded article comprising 50 to 800 parts by weight of styrene-based resin relative to 100 parts by weight of non-crosslinked linear low-density polyethylene-based resin which can be obtained by using a metallocene catalyst, wherein the molded article is obtained by impregnating styrene-modified linear low-density polyethylene-based resin beads with a volatile blowing agent to provide expandable beads, pre-expanding the expandable beads and then subjecting the obtained pre-expanded beads to expansion molding, the styrene-modified linear low-density polyethylene-based resin beads each have the styrene-based resin dispersed in the form of particles, and a diameter of particle is 0.8 μm or smaller in a surface region within at least 5 μm from the bead surface and in a center region within a 5 μm radius from the bead center.

Effect of the Invention

The expanded molded article of the present invention is a molded article obtained from the styrene-modified polyethylene-based resin beads having the following constitution. First of all, among various non-crosslinked linear low-density polyethylene-based resins, those obtained by using a metallocene catalyst are particularly used. Furthermore, the resin beads are modified so as to contain the styrene-based resin in an amount of 50 to 800 parts by weight relative to 100 parts by weight of the polyethylene-based resin containing the inorganic nucleating agent. The modified resin beads have the styrene-based resin dispersed in the form of submicron particles having a particle diameter of 0.8 μm or smaller in the surface region within 5 μm from the bead surface and in the center region within a 5 μm radius from the bead center. This allows the formation of the polyethylene-based resin layer in the surface regions of the beads.

Since the layer of the linear low-density polyethylene-based resin obtained by using the metallocene catalyst is thus formed in the surface regions of the beads, the expanded molded article can have improved chemical resistance. Furthermore, the styrene-based resin in the form of submicron particles can be dispersed also in the center regions within a 5 μm radius from the bead centers, whereby even the expanded molded article with a desired void percentage can achieve an increase in fusion strength of the beads and an improvement in strength properties. There can be also provided an expanded molded article having a significantly high bending strength which could not have been achieved with the linear low-density polyethylene-based resin beads polymerized using a Ziegler-Natta catalyst.

Figure 1:
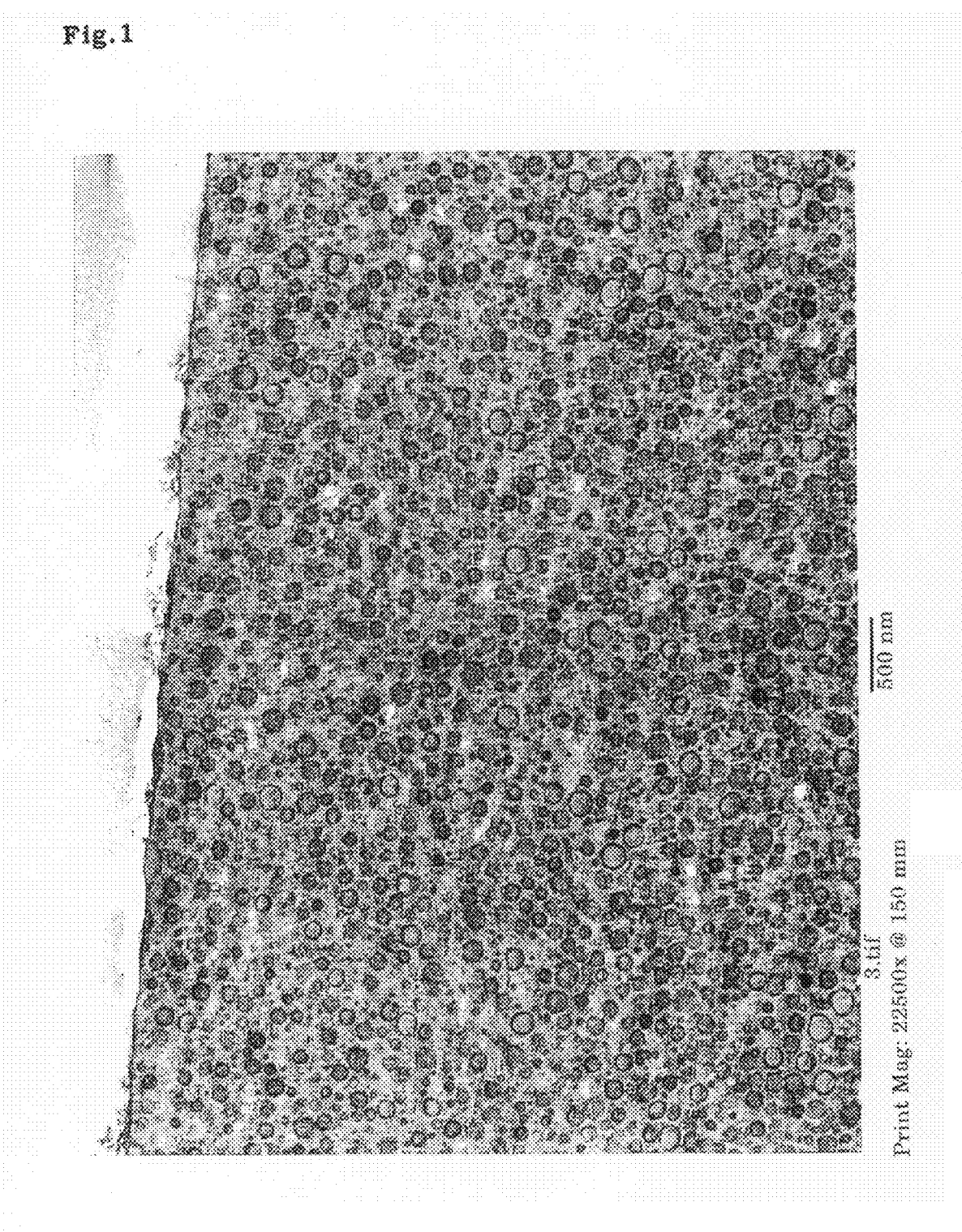
FIG. 1 is a TEM picture showing a surface region cross-section of a modified resin bead according to Example 1 of the present invention.

EXPLANATION OF REFERENCE NUMERALS 1a cavity
2 female mold
2a, 3a steam chamber
2b, 3b steam jetting slits
2c, 3c steam supply pipes
3 male mold
4 steam controller
5 drain valve
6 pre-expanded beads
7 filling instrument
9 pressure detector
10 controlling means

BEST MODE FOR CARRYING OUT THE INVENTION

An expanded molded article according to the present invention can be obtained by pre-expanding expandable beads, in which styrene-modified polyethylene-based resin beads (hereinafter referred to as modified resin beads) are impregnated with a volatile blowing agent, and subjecting the pre-expanded beads to expansion molding. The expanded molded article of the present invention has a void percentage of 5 to 50%.

The modified resin beads contain 50 to 800 parts by weight of styrene-based resin relative to 100 parts by weight of non-crosslinked linear low-density polyethylene-based resin (hereinafter referred to simply as polyethylene-based resin) which contains an inorganic nucleating agent and is obtained by using a metallocene catalyst. The modified resin beads have the styrene-based resin in the form of particles having a particle diameter of 0.8 μm or smaller dispersed in surface regions within at least 5 μm from the bead surfaces and center regions within a 5 μm radius from the bead centers.

The modified resin beads and pre-expanded beads for the production of expanded molded article will now be described.

As the metallocene catalyst, known metallocene catalysts which are employed in polymerization of ethylene-based monomers can be used. For example, a metallocene catalyst having a tetravalent transition metal can be suitably used. More specifically, there can be used cyclopentadienyl titanium tris(dimethylamide), methylcyclopentadienyl titanium tris(dimethylamide), bis(cyclopentadienyl) titanium dichloride, dimethylsilyltetramethylcyclopentadienyl-t-butylamide zirconium dichloride, dimethylsilyltetramethylcyclopentadienyl-t-butylamide hafnium dichloride, dimethylsilyltetramethylcyclopentadienyl-p-n-butylphenylamide zirconium chloride, methylphenylsilyltetramethylcyclopentadienyl-t-butylamide hafnium dichloride, indenyl titanium tris(dimethylamide), indenyl titanium tris(diethylamide), indenyl titanium tris (di-n-propylamide), indenyl titanium bis(di-n-butylamide), indenyl titanium bis(di-n-propylamide) and/or the like. These methallocene catalysts having a tetravalent transition metal may be used alone or two or more of these may be used in combination. Alternatively, the metallocene catalyst may be used together with a cocatalyst such as methylaluminoxane, a boron-based compound or the like.

As the polyethylene-based resin, a homopolymer of ethylene, a copolymer of ethylene and an α-olefin or the like can be used.

As the α-olefin, propylene, 1-butene, 1-pentene, 1-hexene, 3,3-dimethyl-1-butene, 4-methyl-1-pentene, 4,4-dimethyl-1-pentene, 1-heptene, 1-octene and/or the like can be used. Among these, 1-butene and 1-hexene are preferred. These α-olefins may be used alone or two or more of these may be used in combination.

The ratio of ethylene to α-olefin may appropriately vary depending on the desired properties, and preferably is in the range of 1:0.01 to 1:0.1 (in weight). By "low-density", a density in the range of about 0.910 g/ml to 0.925 g/ml is meant.

The polymerization of the polyethylene-based resin is carried out using the metallocene catalyst. For the ethylene homopolymer, for example, vapor-phase polymerization can be employed and for the ethylene/α-olefin copolymer, for example, solution polymerization using an inert medium, bulk polymerization and vapor-phase polymerization which are substantially free of an inert medium can be employed.

The polyethylene-based resin preferably has a molecular weight distribution (Mw/Mn) of 1.5 to 3.5 measured by GPC (Gel Permeation Chromatography). This range of molecular weight distribution allows for easier molding and an improvement in strength (particularly, in bending strength) of the resulting molded articles.

As the non-crosslinked linear polyethylene-based resin which is polymerized using the metallocene catalyst, there can be used the FMRN series manufactured by Nippon Unicar Company Limited, the Evolue F series manufactured by Sumitomo Chemical Co. Ltd., the Evolue series manufactured by Mitsui Chemicals, Inc., the AFFINITY PL series manufactured by Dow Chemical Company or the like.

Together with the above, other polymers and copolymers may be used in such a range that the desired effects of the present invention are not hindered. Specific examples of such polymers and copolymers include low-density polyethylene, high-density polyethylene, an ethylene/propylene copolymer, an ethylene/vinyl acetate copolymer and an ethylene/acrylic acid copolymer having a crosslink and/or a branched chain, and a combination of two or more of these.

As an inorganic nucleating agent, for example, talc, silicon dioxide, mica, clay, zeolite, calcium carbonate or the like can be used.

The amount of the inorganic nucleating agent used is preferably 0.1 to 2 parts by weight, and more preferably 0.2 to 1.5 parts by weight relative to 100 parts by weight of the polyethylene-based resin beads. An amount less than 0.1 parts by weight is not preferred because it would be difficult to diffuse the styrene-based resin in the polyethylene-based resin so as to make the styrene-based resin be in the form of particles of 0.8 μm or smaller. An amount more than 2 parts by weight is not preferred because the strength of the expanded molded article would tend to decrease.

Furthermore, additives such as a coloring material (colorant), a fire retardant, an antioxidant, an ultraviolet absorber and the like may be contained in the polyethylene-based resin beads upon necessity.

As the coloring material, both inorganic and organic coloring materials can be used. Particularly, inorganic coloring materials such as iron oxide, carbon black and the like are preferred.

As the iron oxide, there can be used α-FeOOH (water-containing crystal) as iron oxide yellow, α-$Fe_2O_3$ as iron oxide red, $(FeO)x(Fe_2O_3)y$ as iron oxide black or the like. These iron oxides may have another metal such as Zn, Mg or the like substituting for a part of Fe. Furthermore, the iron oxides may be mixed to obtain a desired color. Among the above iron oxides, $Fe_3O_4$ included in iron oxide black, (FeO)x($Fe_2O_3$)y, is preferred.

The iron oxide preferably has an average particle diameter of 0.1 μm to 1 μm, and more preferably an average particle diameter of 0.2 μm to 0.8 μm. The average particle diameter can be measured with a laser diffraction particle size analyzer (RODOS manufactured by JEOL Ltd.)

The polyethylene-based resin beads contain the iron oxide preferably in the range of 1.5 wt % to 70 wt %, more preferably in the range of 5 wt % to 40 wt %, and still more preferably in the range of 10 wt % to 30 wt %. An amount less than 1.5 wt % is not preferred because the polyethylene-based resin beads may not be adequately colored. An amount more than 70 wt % is not preferred because it would be difficult to mix the iron oxide with the polyethylene-based resin beads. Furthermore, because the specific gravity of the iron oxide is greater than that of the polyethylene-based resin, an amount more than 70 wt % would increase the weight of the resin beads and the resin beads would not be uniformly impregnated with the styrene-based monomer.

As the carbon black, furnace black, channel black, thermal black, acetylene black, graphite, carbon fiber or the like can be used.

The polyethylene-based resin beads contain the carbon black preferably in the range of 1 wt % to 50 wt %, and more preferably in the range of 2 wt % to 30 wt %. An amount less than 1 wt % is not preferred because the polyethylene-based resin beads may not be adequately colored. An amount more than 50 wt % is not preferred because it would be difficult to mix the carbon black with the polyethylene-based resin beads.

Examples of the styrene-based resin include those of monomer origin such as styrene, α-methyl styrene, vinyltoluene, chlorostyrene and the like.

The amount of styrene-based resin is 50 to 800 parts by weight, and preferably 100 to 700 parts by weight relative to 100 parts by weight of the polyethylene-based resin. Where the amount of styrene-based resin is less than 50 parts by weight, it is difficult to show the characteristic of the styrene-based resin, namely, high stiffness. Where the amount of styrene-based resin is more than 800 parts by weight, it is difficult to show the characteristics of the polyethylene-based resin, namely, high elasticity and high oil and impact resistance. Furthermore, the styrene-based monomer cannot be sufficiently absorbed into the inside of the polyethylene-based resin, causing polymer powder in which the styrene-based monomer is polymerized by itself to be generated.

In the case of expandable beads, an amount of styrene-based resin less than 50 parts by weight makes the retention of the volatile blowing agent extremely poor, rendering it difficult to achieve low density. This also renders the expansion molding more difficult.

Particularly, with the styrene-based resin in an amount of 300 parts by weight or more, it is difficult to provide modified resin beads and expandable beads uniformly containing the styrene-based resin by conventional methods. The present invention, on the other hand, can provide such resin beads.

The pre-expanded beads can be obtained by impregnating the modified resin beads with the volatile blowing agent to prepare expandable beads, and expanding the expandable beads.

As the volatile blowing agent, for example, hydrocarbons such as propane, n-butane, isobutane, pentane, isopentane, cylcopentane, hexane and the like can be used alone or two or more of these hydrocarbons can be used in combination.

The content of the volatile blowing agent is preferably 5 to 20 parts by weight relative to 100 parts by weight of resin that makes up the expandable beads (the sum of the polyethylene-based resin and the styrene-based resin).

Preferably, the modified resin beads and the expandable beads each have a cylindrical, spherical or substantially spherical shape with a L/D (where L is a length of the bead and D is a mean diameter of the bead) of 0.6 to 1.6. The average size of the beads is preferably 0.3 mm to 3.0 mm.

The beads having a L/D smaller than 0.6 or greater than 1.6, that is, the beads having high ovality are not preferred because it would be difficult to fill pre-expanded beads obtained from such modified resin beads and expandable beads into a mold when forming an expanded molded article.

The shape of the beads preferably is spherical or substantially spherical so as to make the filling easier.

An average bead size smaller than 0.3 mm is not preferred because the retention of the blowing agent would decrease and the reduction in density would tend to be difficult. An average bead size greater than 3.0 mm is not preferred because not only the filling into a mold would be difficult, but thinning of an expanded molded article would also be difficult.

According to the present invention, there can be provided the modified resin beads and expandable beads. Each of these beads, when seen in cross-section, has the styrene-based resin dispersed in the form of particles of a predetermined size in the polyethylene-based resin as described below.

In other words, there can be provided the modified resin beads and expandable beads each having the styrene-based resin dispersed in particulate form in the polyethylene-based resin in a surface region and a center region of the bead. The surface region is an area within at least 5 μm from the surface of each bead and the center region is an area within a 5 μm radius from the center of the bead. It is not preferable that the styrene-based resin in particulate form forms the continuous phase and thereby the particle diameter exceeds 0.8 μm as shown in the cross-sectional pictures of the bead centers of Comparative Examples 1 and 9, because a remarkable improvement in impact resistance would not be achieved. The styrene-based resin is dispersed in the form of particles having a diameter of 0.8 μm or smaller, and preferably 0.6 μm or smaller in the polyethylene-based resin. The lower limit for the particle diameter of the styrene-based resin in particulate form (hereinafter referred to as styrene-based resin particles) is about 0.01 μm. As described above, the styrene-based resin can be dispersed in particulate form in the surface and center regions of each bead.

The diameter of the styrene-based resin particles in the surface region of each bead is preferably 0.01 μm to 0.8 μm, more preferably 0.01 μm to 0.6 μm, and still more preferably 0.03 μm to 0.4 μm. On the other hand, the diameter of the styrene-based resin particles in the center region of each bead is preferably 0.01 μm to 0.8 μm, more preferably 0.01 μm to 0.6 μm, and still more preferably 0.05 μm to 0.55 μm.

Next, a production method of the modified resin beads and expandable beads will be described.

In an aqueous suspension containing a dispersant, 100 parts by weight of polyethylene-based resin beads, 50 to 800 parts by weight of a styrene-based monomer and 0.1 to 0.9 parts by weight of a polymerization initiator relative to 100 parts by weight of the styrene-based monomer are dispersed. Here, the styrene-based monomer and the initiator may be mixed in advance.

As an aqueous medium that makes up the aqueous suspension, there can be used water or a mixed medium of water and a water-soluble solvent (for example, lower alcohol).

The dispersant is not particularly limited, and any of the known dispersants can be used. More specifically, there can be used slightly soluble inorganic substances such as calcium phosphate, magnesium pyrophosphate, sodium pyrophosphate, magnesium oxide and the like. Furthermore, a surface-active agent such as sodium dodecylbenzene-sulfonate may be used.

The polyethylene-based resin beads can be obtained by known methods. For example, there is a method in which polyethylene-based resin and an inorganic nucleating agent together with an additive, if necessary, are melted and kneaded in an extruder and then extruded from the extruder to obtain a strand. Then, the obtained strand is cut in the air or in the water or cut while being heated to granulate the strand.

Preferably, the polyethylene-based resin beads each have a cylindrical, spherical or substantially spherical shape with a L/D (where L is a length of the bead and D is a mean diameter of the bead) of 0.6 to 1.6. The average size of the beads is preferably 0.2 mm to 1.5 mm. The beads having a L/D smaller than 0.6 or greater than 1.6, that is, the beads having high ovality are not preferred because it would be difficult to fill pre-expanded beads of styrene-modified resin expandable beads into a mold when forming an expanded molded article. The shape of the beads is preferably spherical or substantially spherical so as to make the filling easier. An average bead size smaller than 0.2 mm is not preferred because the retention of the blowing agent would decrease and the reduction in density would tend to be difficult. An average bead size greater than 1.5 mm is not preferred because not only the filling into a mold would be difficult, but thinning of an expanded molded article would also be difficult.

As the polymerization initiator, those typically used as a polymerization initiator for suspension polymerization of a styrene-based monomer can be used. Examples thereof include organic peroxides such as di-t-butyl peroxide, t-butyl peroxy benzoate, dicumyl peroxide, 2,5-dimethyl-2,5-di-t-butylperoxy hexane, t-butylperoxy-3,5,5-trimethyl hexanoate, t-butyl-peroxy-2-ethylhexyl carbonate and the like. These initiators may be used alone or two or more of these may be used in combination.

The amount of the initiator used is preferably 0.1 to 0.9 parts by weight and more preferably 0.2 to 0.8 parts by weight relative to 100 parts by weight of the styrene-based monomer. An amount less than 0.1 parts by weight is not preferred because too much time would be required for the polymerization of the styrene-based monomer. An amount more than 0.9 parts by weight is not preferred because the molecular weight of the styrene-based resin would decrease, and thereby the impact resistance would be reduced.

In order to achieve excellent properties, the molecular weight of the styrene-based resin is preferably about two hundred thousands to about five hundred thousands. However, where more than 0.9 parts by weight of the initiator is used, only a molecular weight smaller than the above-mentioned range may be obtained.

50 to 800 parts by weight of the styrene-based monomer relative to 100 parts by weight of the polyethylene-based resin beads is added and dispersed preferably under stirring, and the resulting dispersion is heated to such a temperature that the styrene-based monomer does not substantially polymerize so that the polyethylene-based resin beads are impregnated with the styrene-based monomer.

The time appropriate for sufficiently impregnating the inside of the polyethylene-based resin beads with the styrene-based monomer is 30 minutes to 3 hours. Where polymerization takes place before the beads are sufficiently impregnated, polymer powder of the styrene-based resin is generated. It is desirable that the generation of polymer powder is prevented. It is advantageous that the temperature at which the monomer does not substantially polymerize is as high as possible to accelerate the impregnation rate, but it needs to be determined with consideration given to the decomposition temperature of the initiator.

Next, polymerization of the styrene-based monomer is carried out at a temperature of (T+10)° C. to (T+35)° C. where T° C. is the crystallization peak temperature of the polyethylene-based resin beads.

A polymerization temperature lower than (T+10)° C. is not preferred because the styrene-based resin would not be dispersed in particulate form near the center regions of modified resin beads and the styrene-based resin would be the continuous phase. Furthermore, a polymerization temperature higher than (T+35)° C. is not preferred because aggregated particles in which particles coalesce would be generated.

With the above steps, the modified resin beads can be obtained. The expandable beads can be obtained by impregnating the modified resin beads during or after the polymerization with the volatile blowing agent. The impregnation can be carried out by per se known methods. For example, the impregnation during the polymerization can be carried out by making polymerization reaction to occur in a closed vessel and injecting the volatile blowing agent into the vessel. The impregnation after the polymerization can be carried out by injecting the volatile blowing agent into a closed vessel.

Thus, the modified resin beads and expandable beads having excellent characteristics can be provided by the above-mentioned methods. However, where the amount of styrene-based monomer exceeds 300 parts by weight relative to 100 parts by weight of the polyethylene-based resin beads, polymer powder of the styrene-based monomer tends to increase in amount.

In other words, when the amount of styrene-based monomer is 50 to 300 parts by weight relative to 100 parts by weight of the polyethylene-based resin, the amount of polymer powder of styrene-based resin is small and the modified resin beads and expandable beads having the most stable, excellent characteristics can be easily provided.

Where the amount of styrene-based monomer exceeds 300 parts by weight, it is preferable that the polyethylene-based resin beads are impregnated with the styrene-based monomer in two separate steps as described below in order to reduce the generation of polymer powder.

In an aqueous suspension containing a dispersant, 100 parts by weight of polyethylene-based resin beads, 30 to 300 parts by weight of a styrene-based monomer and 0.1 to 0.9 parts by weight of a polymerization initiator relative to 100 parts by weight of the styrene-based monomer are dispersed. Here, the styrene-based monomer and the initiator may be mixed in advance.

Then, the resulting dispersion is heated to such a temperature that the styrene-based monomer does not substantially polymerize to impregnate the polyethylene-based resin beads with the styrene-based monomer.

Subsequently, first polymerization of the styrene-based monomer is carried out at a temperature of $(T+10)°$ C. to $(T+35)°$ C. where $T°$ C. is the crystallization peak temperature of the polyethylene-based resin beads.

Next, a styrene-based monomer and 0.1 to 0.9 parts by weight of a polymerization initiator relative to 100 parts by weight of the styrene-based monomer are added to the reaction solution of the first polymerization, and the temperature is adjusted to $(T+10)°$ C. to $(T+35)°$ C. where $T°$ C. is the crystallization peak temperature of the polyethylene-based resin beads, so that impregnation of the low-density polyethylene-based resin beads with the styrene-based monomer and second polymerization take place. The total amount of the styrene-based monomers used in the first and second polymerization is 50 to 800 parts by weight relative to 100 parts by weight of the polyethylene-based resin beads. The styrene-based monomer and the initiator may be mixed in advance.

The second addition of the styrene-based monomer and the initiator may be continuous or intermittent. In order to effectively prevent the generation of polymer powder, it is preferable that the impregnation of the inside of the polyethylene-based resin beads and the polymerization take place at approximately the same time. Because the polymerization is carried out at a relatively high temperature, a too high addition rate is not preferred. If the addition rate is too high, the polymerization would proceed before the impregnation takes place. For example, the addition rate is preferably 30 to 100 parts by weight/hour.

With the above steps, the modified resin beads can be obtained. The expandable beads can be obtained as described above by impregnating the resin beads during or after the polymerization with the volatile blowing agent. The impregnation can be carried out by per se known methods such as the one described in Examples.

The expandable beads can be formed into pre-expanded beads by pre-expanding the expandable beads to a predetermined bulk density (for example, 10 kg/m³ to 300 kg/m³ and more preferably 10 kg/m³ to 60 kg/m³) by known methods. The method of measuring the bulk density will be described in Examples.

Furthermore, an expanded molded article having a void percentage of 5 to 50% can be provided by filling the pre-expanded beads into a mold of an expansion-molding machine, and while heating again to expand the pre-expanded beads, heat fusing the expanded beads. Where the void percentage is smaller than 5%, the expanded molded article would be insufficient in sound absorption. Where the void percentage is greater than 50%, the bending strength would be insufficient and sound absorption cannot be achieved because the sound waves pass through the molded article. The void percentage is preferably in the range of 5 to 30%.

Figure 12:
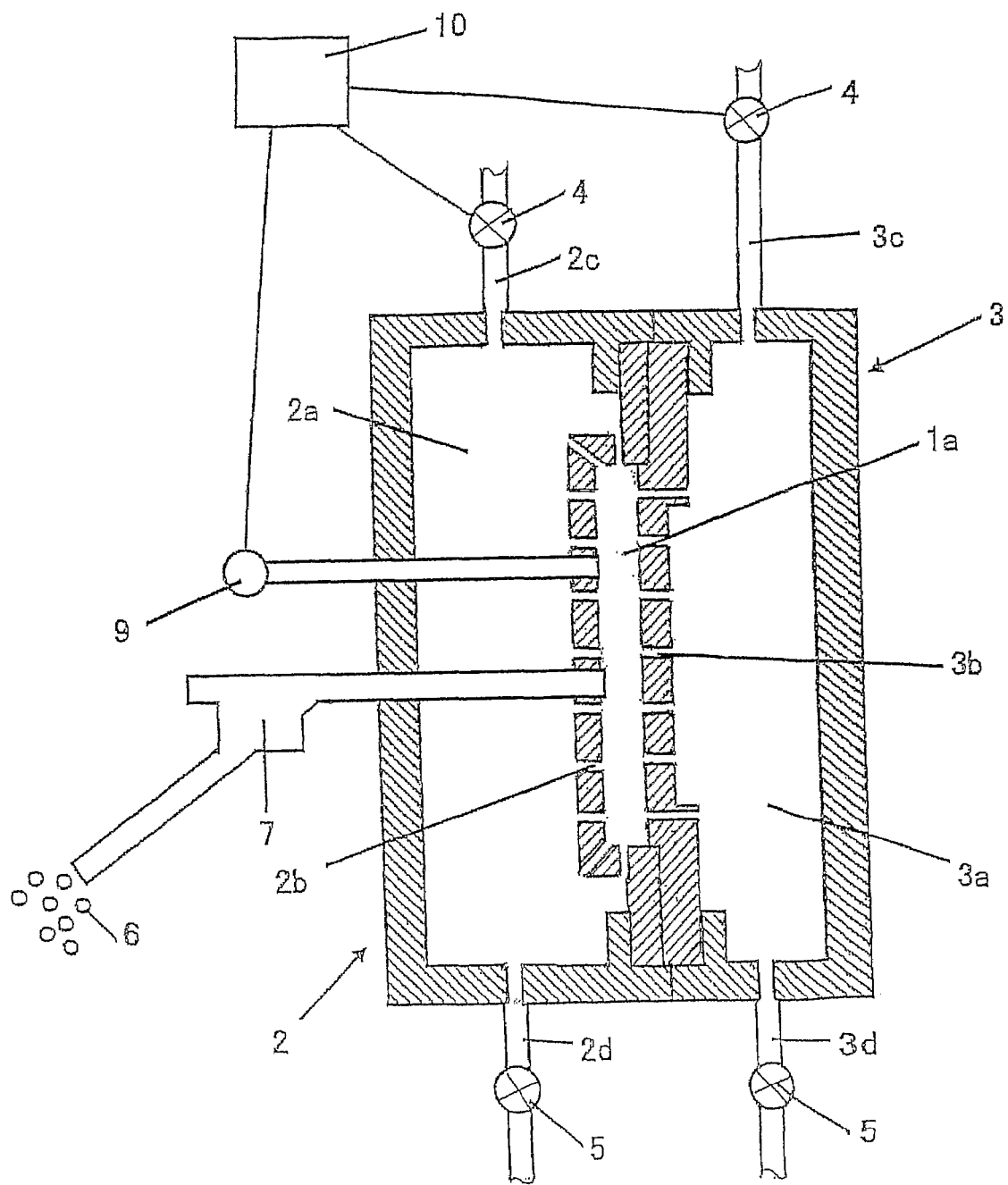
FIG. 12 is a schematic view of an expansion-molding machine that can be used in the present invention.

The expansion-molding machine is not particularly limited, and any known expansion-molding machine can be used. FIG. 12 illustrates an exemplary expansion-molding machine. The expansion-molding machine illustrated in this figure includes a female mold 2 and a male mold 3 which form a cavity 1a when engaged. The molds 2, 3 respectively include steam chambers 2a, 3a and a plurality of steam jetting slits 2b, 3b perforated therein to provide communication between the steam chambers 2a, 3a and the cavity 1a. On the other hand, steam supply pipes 2c, 3c and steam discharge pipes 2d, 3d for supplying/discharging steam to/out the steam chambers 2a, 3a are also provided, respectively. Furthermore, the steam supply pipes 2c, 3c each have a steam controller 4, and the steam discharge pipes 2d and 3d each have a drain valve 5.

The female mold 2 includes a filling instrument 7 for filling pre-expanded beads 6 into the cavity 1a and also a pressure detector 9 for detecting the expansion pressure of the pre-expanded beads in the cavity 1a. The machine also includes a controlling means 10 for controlling the pressure detector 9, each of the steam controllers 4, the drain valves 5 and the like.

An expansion-molding process using the pre-expanded beads can be broadly divided into heating operations and cooling operation. The heating operations are usually subdivided into (1) a mold heating step, (2) a one-side heating step, (3) an other-side heating step and (4) a both-side heating step. The cooling operation is carried out after the heating operations and then the molded article is obtained. An exemplary process will be illustrated with reference to FIG. 12.

(1) In the mold heating step, the temperatures of the molds 2, 3 are mainly raised. More specifically, after the pre-expanded beads 6 are filled into the cavity 1a between the molds by the filling instrument 7, steam is introduced into both the steam chambers 2a, 3a of the female and male molds 2, 3 from the steam supply pipes 2c, 3c, respectively, and the air present in the chambers is discharged from the drain valves 5 provided in the steam discharge pipes 2d and 3d.

(2) The one-side heating step is intended for preheating of the molds for expansion of the pre-expanded beads 6 again and for expulsion of the air inside the cavity 1a. In this step, steam is introduced from the steam chamber of either one of the molds, for example, from the steam chamber 3a of the male mold 3 to flow through the voids of the pre-expanded beads 6 filled inside the cavity 1a, and the steam is discharged to the outside through the steam chamber 2a of the other mold (i.e., female mold 2). This step usually finishes when the pressure of the introduced steam and the expansion pressure in the cavity are equal.

(3) The other-side heating step is intended for balancing the temperature gradient of the pre-expanded beads 6 caused in the previous one-side heating step. In this step, steam is introduced inversely from the steam chamber 2a of the female mold 2 to the cavity 1a to heat the pre-expanded beads 6, and the steam is discharged from the steam chamber 3a of the male mold 3.

(4) The both-side heating step is intended for secondary expansion of the pre-expanded beads 6 to ultimately fuse the expanded beads together. In this step, steam is delivered into both the steam chambers 2a, 3a of the molds 2, 3 and the pressure is raised.

As long as the molding is carried out according to the above heating steps (1) to (4), an expanded molded article having no voids between the beads, that is, a molded article in which surface of the expanded beads are fused together can be obtained. However, the expanded molded article of the present invention has voids therein and it is necessary to leave space between the beads at the time of expansion molding. For this reason, it is preferable that the expansion molding is carried out according to such a process as described below.

(A) The mold heating step can be performed in the same manner as in the usual expansion molding process. It is preferable that this step is carried out for 3 seconds to 12 seconds.

(B) The air that is present between the beads is expelled in the one-side heating step. In this step, the heating is continued until the pressure of the introduced steam and the expansion pressure in the cavity become equal, and the heating is still continued to appropriately fill the voids between the beads. Thus, it is preferable that this step is carried out for 5 seconds to 25 seconds.

The other-side heating step may be performed to balance the temperature gradient of the pre-expanded beads 6 as long as the void percentage can be maintained in a predetermined range. More specifically, the other-side heating step is preferably performed for about 0 second to 1 second. The other-side heating step may be carried out before the one-side heating step.

(C) The both-side heating may not be performed or may be performed for a short time not longer than 3 seconds because it has an effect of rapidly filling the voids between the expanded beads.

In accordance with the above molding process, bonding between the expanded beads can be stronger, and thereby the void-containing expanded molded article with improved strength can be provided.

The obtained expanded molded article is strong and excellent in chemical resistance and bending strength. Since the molded article is modified with the styrene-based resin, it also has high stiffness. Furthermore, the molded article is excellent in heat insulation, lightweight properties and sound absorption since it has specific void percentage.

The expanded molded article according to the present invention can be used for various purposes, and is particularly suitable for use in materials for automobile interiors, energy absorbing materials inserted inside bumpers, packing materials for heavy products, and the like.

Since the present invention employs as polyethylene-based resin the resin using a metallocene catalyst, it can provide an expanded molded article having a bending strength of 0.3 MPa or greater. The product with a bending strength of 0.3 MPa or greater does not easily suffer from cracking and chipping and can suitably be used particularly for energy absorbing materials. A bending strength of 0.32 MPa or greater is more preferred. A method for measuring the bending strength will be described in Examples.

EXAMPLES

The present invention will hereinafter be described by way of Examples and Comparative Examples. It should be understood that the invention be not limited to these Examples. The measurement methods of various values adopted in Examples and Comparative Examples will also be described below.

[Measurement of Crystallization Peak Temperature of Polyethylene-Based Resin]

The crystallization peak temperature is measured according to JIS K7121 using a differential scanning calorimeter (DSC). More specifically, resin as a measurement sample is set on a measuring vessel of the DSC, and the temperature is raised to 280° C. at a heating rate of 10° C./min. After being kept at 280° C. for 10 min., the resin is left to cool to a room temperature (23° C.) and the crystallization peak temperature is measured while the temperature of the resin is raised again at a heating rate of 10° C./min.

[Measurement of Melt Flow Rate of Polyethylene-Based Resin]

The melt flow rate is measured at 230° C. under a load of 10 kgf according to JIS K7210.

[Measurement of Polyethylene-Based Resin Density]

The density is measured according to JIS K6992-2.

[Measurement of Molecular Weight Distribution: Mw/Mn]

The measurement is carried out by GPC under the following conditions.

Instrument: GPC instrument Type 150C manufactured by Nihon Waters K.K.

Column: TSK GMH-6 manufactured by TOSOH Corporation

Solvent: ortho-dichlorobenzene (ODCB)

Temperature: 135° C.

Flow rate: 1 ml/min.

Injection concentration: 10 mg/10 ml ODCB (injection amount: 500 μl)

The weight-average molecular weight Mw and the number-average molecular weight Mn are determined by conversion from the calibration curve using standard styrene resin, and then the Mw/Mn is calculated.

[Measurement of Bulk Density]

The measurement is carried out according to a method described in JIS K 6911:1995 "General testing methods for thermosetting plastics". More specifically, pre-expanded beads are allowed to free fall into a measuring cylinder and their weight is measured by an apparent density measuring instrument. The bulk density is determined from the following equation.

$$\text{bulk density}(kg/m^3) = \text{weight}(kg)/\text{beads volume in graduated cylinder}(m^3)$$

[Void Percentage]

An expanded molded article having an apparent bulk volume (V1) is immersed into a graduated cylinder filled with a predetermined amount of water, and an increase in volume (V2) is measured. The void percentage is determined by the following equation.

$$\text{void percentage} = \{(V1 - V2)/V1\} \times 100$$

[Bending Strength]

The maximum bending strength is measured according to a method described in JIS A 9511:1999 "Prefoamed Cellular Plastics Thermal Insulation Materials". More specifically, the bending strength is measured using a universal testing machine Tensilon UCT-10T (manufactured by Orientech Co., Ltd.) and a sample having a size of 75 mm×300 mm×15 mm under the conditions: a pressure wedge (10R) as a tip jig, a fulcrum (10R) with a 200-mm distance between the supporting points and a compression rate of 10 mm/min.

[Sound Absorption Coefficient]

The sound absorption coefficient is measured according to a method described in JIS A 1405:1998 "Acoustics-determination of sound absorption coefficient and impedance in impedance tubes-method using standing wave ratio". More specifically, the sound absorption coefficient at 1 kHz is measured using a vertically-incident sound absorption coefficient measuring instrument TYPE 10041 (probe-tube microphone) manufactured by Japan Electronic Instrument Co. LTD. For the measurement, a sample having a 30-mm thickness is brought into close contact with a back plate of a sample holder.

[Chemical Resistance]

Three pieces of plate-like samples having a flat rectangular shape and a size of 100 mm length×100 mm width×20 mm thickness are cut from an expanded molded article. The samples are left standing at 23° C. and a 50% humidity for 24 hours. The samples are cut from the expanded molded article so that the upper surface of each sample is entirely formed of the surface of the molded article.

Then, 1 g of various chemicals (gasoline, kerosene, dibutylphthalate (DBP)) are respectively applied uniformly to the surfaces of the three samples and the samples are left standing at 23° C. and a 50% humidity for 60 minutes. Subsequently, the chemicals are wiped off the surfaces of the samples and the surfaces of the samples are visually observed to make assessments according to the following ratings.

○: fine, no changes

Δ: slightly bad, surface softens

X: bad, surface caves in (shrinks)

Example 1

As a non-crosslinked linear low-density polyethylene-based resin, LLDPE (manufactured by Nippon Unicar Company Limited, tradename: FMRN-063, crystallization peak temperature: 101° C., melt flow rate: 1.3 g/10 min., density: 0.914 g/cm$^3$, molecular weight distribution (Mw/Mn): 2.77) synthesized by using a metallocene catalyst was employed. 100 parts by weight of the LLDPE and 0.5 parts by weight of talc were fed into an extruder. The feedstock was melted and kneaded, and then granulated by under water cut system to provide oval (egg-shaped) polyethylene-based resin beads. The average weight of the polyethylene-based resin beads was 0.6 mg.

Next, 0.8 parts by weight of magnesium pyrophosphate (dispersant) and 0.02 parts by weight of sodium dodecylbenzenesulfonate (surface-active agent) were dispersed in 100 parts by weight of water to obtain a medium for dispersion.

In the dispersion medium, 100.5 parts by weight of the polyethylene-based resin beads were dispersed to obtain a suspension.

0.19 parts by weight of dicumyl peroxide as a polymerization initiator was dissolved in advance in 100 parts by weight of a styrene monomer.

The temperature of the dispersion of the polyethylene-based resin beads was adjusted to 60° C. and the styrene monomer containing the initiator was added quantitatively to the dispersion over 30 min. Then, the resulting mixture was stirred at 60° C. for an hour to impregnate the polyethylene-based resin beads with the styrene monomer.

Next, the temperature of the dispersion was raised to 130° C. and kept for 2 hours to polymerize the styrene monomer in the polyethylene-based resin beads. Thus, modified resin beads were obtained.

Figure 2:
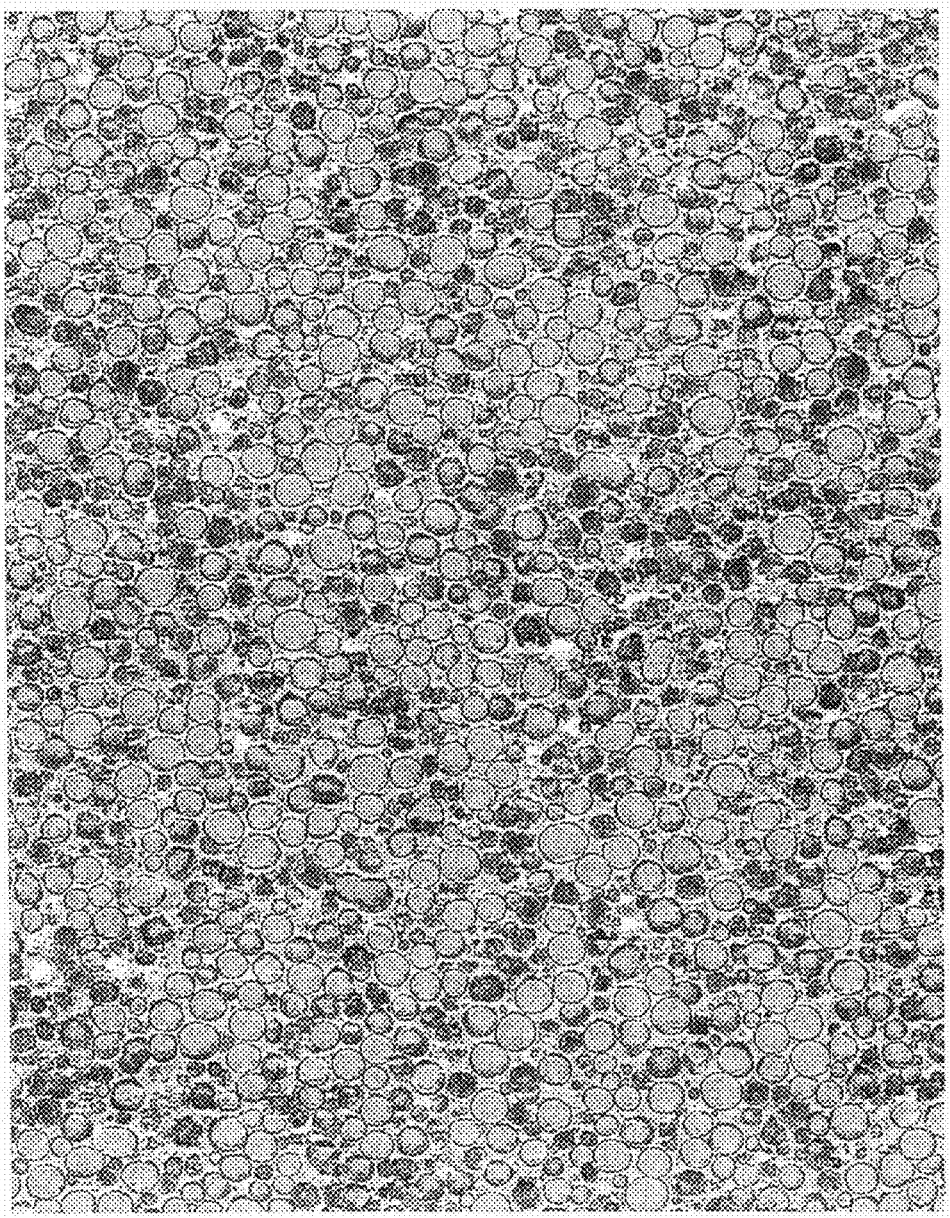
FIG. 2 is a TEM picture showing a center region cross-section of the modified resin bead according to Example 1 of the present invention.

The dispersion state of styrene resin in the obtained modified resin beads was observed by a TEM (transmission electron microscope). The styrene resin was dispersed in the form of particles, and a diameter of particle was 0.04 μm to 0.2 μm in a surface region (×22,500, an area within about 5 μm from the surface) and the styrene resin was dispersed in the form of particles, and a diameter of particle was 0.05 μm to 0.5 μm in a center region (×12,800, an area within about a 5 μm radius from the center). The cross-sectional pictures of the surface region and the center region are shown in FIG. 1 and FIG. 2, respectively.

Subsequently, 100 parts by weight of the modified resin beads, 0.15 parts by weight of monoglyceride stearate and 0.5 parts by weight of diisobutyl adipate were fed into a pressure-resistant V-type rotary mixer having a volume of 1 m$^3$, and 14 parts by weight of butane (n-butane: i-butane=7:3) as a volatile blowing agent was injected at a normal temperature while the mixer was rotated. After the temperature was raised to 70° C. and kept for 4 hours, it was cooled to 25° C. to obtain expandable beads. The obtained expandable beads had styrene resin dispersed in the form of particles, and a diameter of particle was of 0.04 μm to 0.2 μm in a surface region and styrene resin was dispersed in the form of particles, and a diameter of particle was 0.05 μm to 0.5 μm in a center region as in the case of the above-mentioned modified resin beads.

The obtained expandable beads were immediately pre-expanded using steam to a bulk density of 30 kg/m$^3$ so that pre-expanded beads were obtained. Then, the pre-expanded beads were filled into a mold of an expansion-molding machine, and using steam at a pressure of 0.08 MPa, (1) mold heating for 7 seconds, (2) one-side heating for 15 seconds, (3) other-side heating for 0.5 seconds and (4) both-side heating for 0.5 seconds were sequentially performed. After the heating, the mold was water-cooled to obtain an expanded molded article.

The following expansion-molding machine was used for the molding.

Expansion-molding machine used: ACE-3SP (manufactured by

Sekisui Machinery Co., Ltd.)

Mold size: 300 mm×400 mm×30 mm

The obtained expanded molded article has voids. The void percentage, bending strength, sound absorption coefficient and chemical resistance of the obtained expanded molded article were measured. The results are shown in Table 1.

Example 2

100.5 parts by weight of polyethylene-based resin beads obtained in the same manner as in Example 1 were dispersed in a dispersion medium obtained in the same manner as in Example 1.

Furthermore, 0.19 parts by weight of dicumyl peroxide as a polymerization initiator was dissolved in advance in 66 parts by weight of a styrene monomer to obtain a first styrene monomer.

The temperature of the dispersion of the polyethylene-based resin beads was adjusted to 60° C. and the first styrene monomer containing the initiator was added quantitatively to the dispersion over 30 min. Then, the resulting mixture was stirred at 60° C. for an hour to impregnate the polyethylene-based resin beads with the first styrene monomer.

Next, the temperature of the dispersion was raised to 130° C. and kept for two hours to polymerize (first polymerization) the first styrene monomer in the polyethylene-based resin beads.

Subsequently, 0.3 parts by weight of dicumyl peroxide as a polymerization initiator was dissolved in 534 parts by weight of a styrene monomer to obtain a second styrene monomer. The second styrene monomer was dropped continuously into the reaction solution of the first polymerization at a rate of 80 parts by weight per hour for 7 hours, so that the second styrene monomer was polymerized (second polymerization) while the polyethylene-based resin beads were impregnated with the monomer to obtain modified resin beads.

Figure 3:
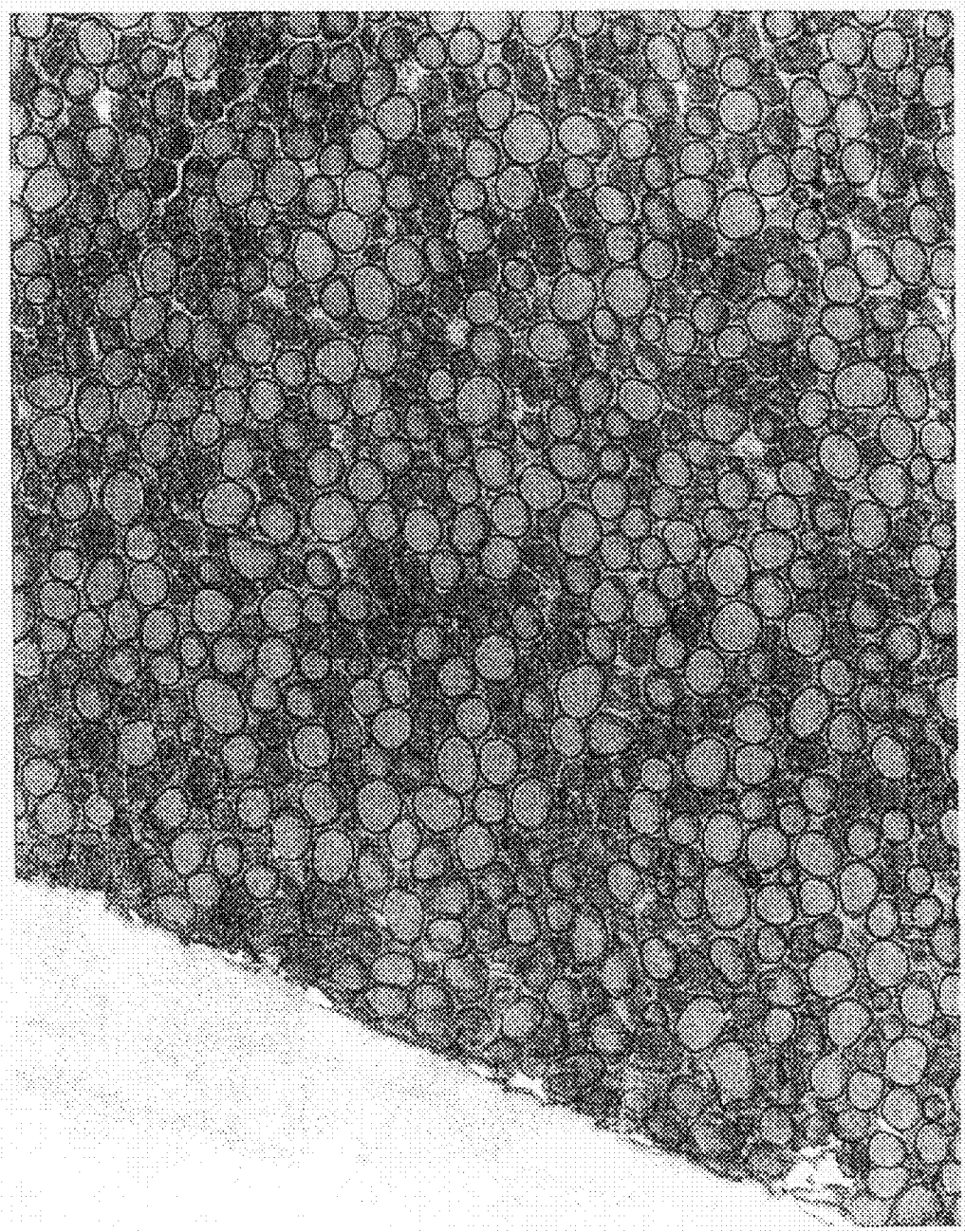
FIG. 3 is a TEM picture showing a surface region cross-section of a modified resin bead according to Example 2 of the present invention.
Figure 4:
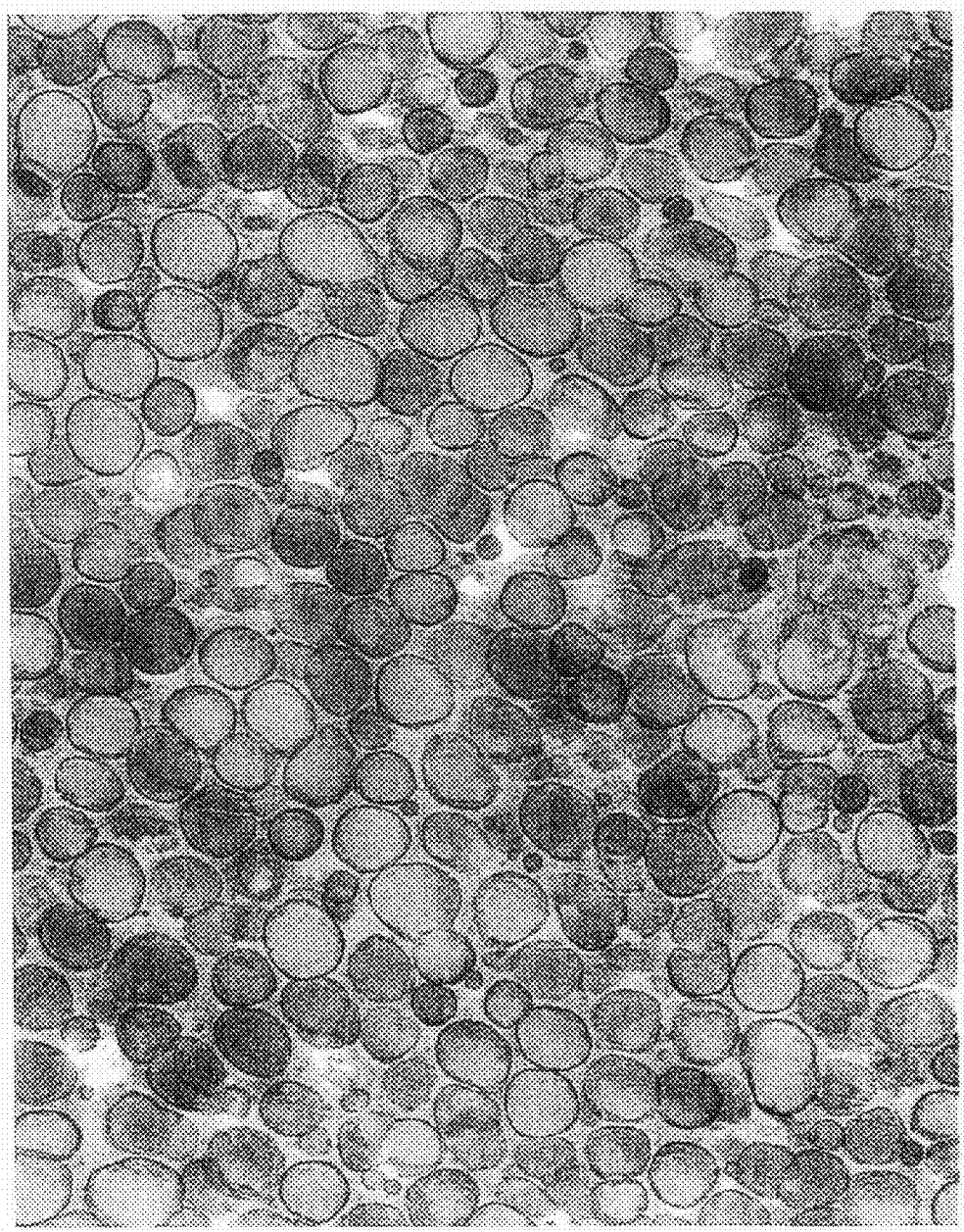
FIG. 4 is a TEM picture showing a center region cross-section of the modified resin bead according to Example 2 of the present invention.

The dispersion state of styrene resin in the obtained modified resin beads was observed by the TEM (transmission electron microscope). The styrene resin was dispersed in the form of particles, and a diameter of particle was 0.05 µm to 0.35 µm in a surface region (×19,300, an area within about 5 µm from the surface) and the styrene resin was dispersed in the form of particles, and a diameter of particle was 0.06 µm to 0.4 µm in a center region (×38,600, an area within about a 5 µm radius from the center). The cross-sectional pictures of the surface region and the center region are shown in FIG. 3 and FIG. 4, respectively.

Subsequently, expandable beads were prepared in the same manner as in Example 1. The obtained expandable beads had styrene resin dispersed in the form of particles, and a diameter of particle was 0.05 µm to 0.35 µm in a surface region and styrene resin was dispersed in the form of particles, and a diameter of particle was 0.06 µm to 0.4 µm in a center region as in the case of the above-mentioned modified resin beads.

The obtained expandable beads were immediately pre-expanded using steam to a bulk density of 30 kg/m$^3$ so that pre-expanded beads were obtained. Then, the pre-expanded beads were subjected to molding in the same manner as in Example 1 to obtain an expanded molded article. The same molding machine as in Example 1 was used for the molding.

The obtained expanded molded article was a molded article having voids. The void percentage, bending strength, sound absorption coefficient and chemical resistance of the obtained expanded molded article were measured. The results are shown in Table 1.

Figure 5:
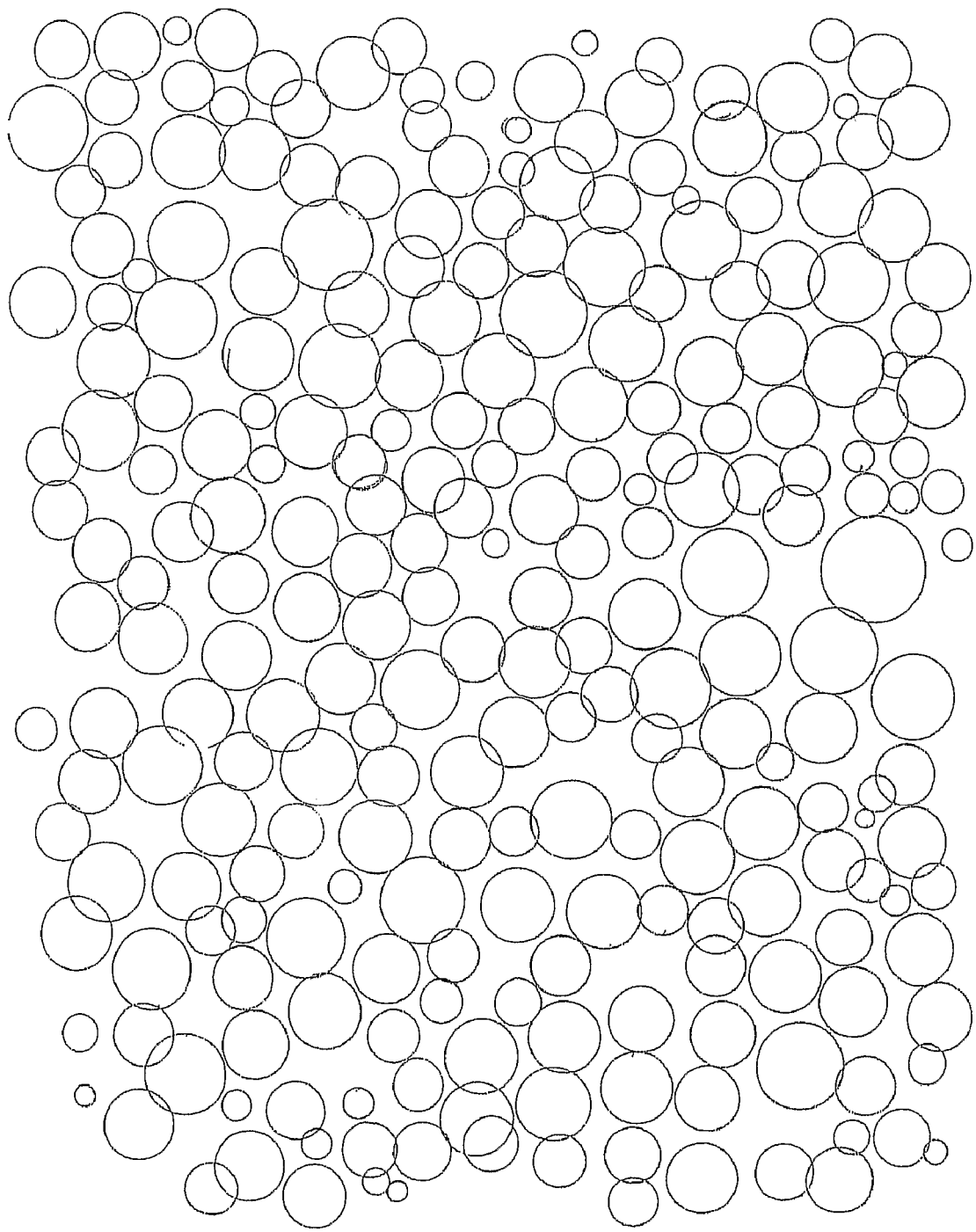
FIG. 5 is a view in which the TEM picture of FIG. 4 is traced.

The diameter of the styrene resin dispersed in the form of particles in the surface region and the center region were determined as follows. The particles of FIG. 4, for example, were traced as shown in FIG. 5 in such a manner that the areas of the particles of the two figures are substantially equal. The diameter of each particle was measured from the tracing of FIG. 5 and it was confirmed that the particle diameters were in the range of 0.06 µm to 0.4 µm.

Example 3

Modified resin beads were obtained in the same manner as in Example 2 except that "Evolue F-201" manufactured by Sumitomo Chemical Co. Ltd. (melting point: 117° C., crystallization peak temperature: 108° C., melt flow rate: 1.5 g/10 min., density: 0.915 g/cm$^3$, and molecular weight distribution (Mw/Mn): 2.5) was employed as the linear low-density polyethylene-based resin.

The dispersion state of styrene resin in the obtained modified resin beads was observed by the TEM. The styrene resin was dispersed in the form of particles, and a diameter of particle was 0.05 µm to 0.3 µm in a surface region (an area within about 5 µm from the surface) and the styrene resin was dispersed in the form of particles, and a diameter of particle was 0.1 µm to 0.5 µm in a center region (an area within about a 5 µm radius from the center).

Next, expandable beads were obtained in the same manner as in Example 1. In the obtained expandable beads, the styrene resin was dispersed in the form of particles, and a diameter of particle was 0.05 µm to 0.3 µm in a surface region and the styrene resin was dispersed in the form of particles, and a diameter of particle was 0.1 µm to 0.5 µm in a center region as in the case of the above-mentioned modified resin beads.

The expandable beads were pre-expanded in the same manner as in Example 2 to obtain pre-expanded beads. Then, the pre-expanded beads were filled into a mold of a molding machine, and using steam at a pressure of 0.08 MPa, (1) mold heating for 7 seconds, (2) one-side heating for 15 seconds, (3) other-side heating for 0.5 seconds and (4) both-side heating for 2 seconds were sequentially performed. After the heating, the mold was water-cooled to obtain an expanded molded article.

The obtained expanded molded article has voids. The void percentage, bending strength, sound absorption coefficient and chemical resistance of the obtained expanded molded article were measured. The results are shown in Table 1.

Example 4

Into an extruder, 100 parts by weight of the same linear low-density polyethylene-based resin as that of Example 1, 25 parts by weight of iron oxide particles ($Fe_3O_4$) and 0.5 parts by weight of talc were fed. The feedstock was melted and kneaded, and then granulated by under water cut system to provide oval (egg-shaped) black-colored polyethylene-based resin beads. The average weight of the polyethylene-based resin beads containing iron oxide was 0.7 mg.

Modified resin beads and expandable beads were obtained in the same manner as in Example 2 except that the obtained iron oxide-containing polyethylene-based resin beads were used.

The dispersion states of styrene resin in the obtained modified resin beads and expandable beads were observed by the TEM in the same manner as in Example 1. The styrene resin was dispersed in the form of particles, and a diameter of particle was 0.05 µm to 0.3 µm in surface regions and the styrene resin was dispersed in the form of particles, and a diameter of particle was 0.1 µm to 0.45 µm in center regions.

The expandable beads were pre-expanded in the same manner as in Example 1 to obtain pre-expanded beads. Then, the pre-expanded beads were subjected to molding in the same manner as in Example 1 to provide an expanded molded article.

The obtained expanded molded article has voids. The void percentage, bending strength, sound absorption coefficient and chemical resistance of the obtained expanded molded article were measured. The results are shown in Table 1.

Example 5

Oval (egg-shaped) black-colored polyethylene-based resin beads were obtained in the same manner as in Example 4 except that 3 parts by weight of carbon black particles were used instead of the iron oxide particles. The average weight of the carbon black-containing polyethylene-based resin beads was 0.6 mg.

Modified resin beads were obtained in the same manner as in Example 1 except that the obtained carbon black-containing polyethylene-based resin beads were used. Then, expandable beads were obtained in the same manner as in Example 1.

The dispersion states of styrene resin in the obtained modified resin beads and expandable beads were observed by the TEM in the same manner as in Example 1. The styrene resin was dispersed in the form of particles, and a diameter of particle was 0.06 μm to 0.3 μm in surface regions and the styrene resin in the form of particles, and a diameter of particle was 0.1 μm to 0.55 μm in center regions.

The expandable beads were pre-expanded in the same manner as in Example 1 to obtain pre-expanded beads. Then, the pre-expanded beads were subjected to molding in the same manner as in Example 1 to provide an expanded molded article.

The obtained expanded molded article was a molded article having voids. The void percentage, bending strength, sound absorption coefficient and chemical resistance of the obtained expanded molded article were measured. The results are shown in Table 1.

Example 6

Modified resin beads and expandable beads were obtained in the same manner as in Example 1 except that the amounts of styrene monomer and α-methylstyrene monomer were 95 parts by weight and 5 parts by weight, respectively.

The dispersion states of styrene resin in the obtained modified resin beads and expandable beads were observed by the TEM. The styrene resin was dispersed in the form of particles, and a diameter of particle was 0.04 μm to 0.2 μm in surface regions (areas within about 5 μm from the surfaces) and the styrene resin was dispersed in the form of particles, and a diameter of particle was 0.05 μm to 0.5 μm in center regions (areas within about a 5 μm radius from the centers).

The expandable beads were pre-expanded in the same manner as in Example 1 to obtain pre-expanded beads. Then, the pre-expanded beads were subjected to molding in the same manner as in Example 1 to provide an expanded molded article.

The obtained expanded molded article has voids. The void percentage, bending strength, sound absorption coefficient and chemical resistance of the obtained expanded molded article were measured. The results are shown in Table 1.

Example 7

Modified resin beads were obtained in the same manner as in Example 2 except that the amounts of the first and second styrene monomers were 50 parts by weight and 350 parts by weight, respectively, t-butylperoxybenzoate was used as the polymerization initiator and the polymerization temperature was 115° C. Then, expandable beads were obtained in the same manner as in Example 1.

The dispersion states of styrene resin in the obtained modified resin beads and expandable beads were observed by the TEM. The styrene resin was dispersed in the form of particles, and a diameter of particle was 0.05 μm to 0.4 μm in surface regions (areas within about 5 μm from the surfaces) and the styrene resin was dispersed in the form of particles, and a diameter of particle was 0.1 μm to 0.5 μm in center regions (areas within about a 5 μm radius from the centers).

The expandable beads were pre-expanded in the same manner as in Example 1 to obtain pre-expanded beads. Then, the pre-expanded beads were subjected to molding in the same manner as in Example 1 to provide an expanded molded article.

The obtained expanded molded article has voids. The void percentage, bending strength, sound absorption coefficient and chemical resistance of the obtained expanded molded article were measured. The results are shown in Table 1.

Example 8

Modified resin beads were obtained in the same manner as in Example 7 except that the inorganic nucleating agent added was silica, dicumyl peroxide was used as the initiator and the polymerization temperature was 140° C. Then, expandable beads were obtained in the same manner as in Example 1.

The dispersion states of styrene resin in the obtained modified resin beads and expandable beads were observed by the TEM. The styrene resin was dispersed in the form of particles, and a diameter of particle was 0.03 μm to 0.3 μm in surface regions (areas within about 5 μm from the surfaces) and the styrene resin was dispersed in the form of particles, and a diameter of particle was 0.08 μm to 0.4 μm in center regions (areas within about a 5 μm radius from the centers).

The expandable beads were pre-expanded in the same manner as in Example 1 to obtain pre-expanded beads. Then, the pre-expanded beads were filled into a mold of a molding machine, and using steam at a pressure of 0.08 MPa, (1) mold heating for 7 seconds, (2) one-side heating for 12 seconds, (3) other-side heating for 0.5 seconds and (4) both-side heating for 0.5 seconds were sequentially performed. After the heating, the mold was water-cooled to obtain an expanded molded article.

The obtained expanded molded article has voids. The void percentage, bending strength, sound absorption coefficient and chemical resistance of the obtained expanded molded article were measured. The results are shown in Table 1.

Example 9

Modified resin beads were obtained in the same manner as in Example 2 except that the amounts of the first styrene-monomer and the second styrene-based monomer were 120 parts by weight and 80 parts by weight, respectively. Then, expandable beads were obtained in the same manner as in Example 1.

The dispersion states of styrene resin in the obtained modified resin beads and expandable beads were observed by the TEM. The styrene resin was dispersed in the form of particles, and a diameter of particle was 0.04 μm to 0.3 μm in surface regions (areas within about 5 μm from the surfaces) and the styrene resin was dispersed in the form of particles, and a diameter of particle was 0.05 μm to 0.5 μm in center regions (areas within about a 5 μm radius from the centers).

The expandable beads were pre-expanded in the same manner as in Example 1 to obtain pre-expanded beads. Then, the pre-expanded beads were subjected to molding in the same manner as in Example 1 to provide an expanded molded article.

The obtained expanded molded article has voids. The void percentage, bending strength, sound absorption coefficient and chemical resistance of the obtained expanded molded article were measured. The results are shown in Table 1.

Example 10

Modified resin beads were obtained in the same manner as in Example 2 except for the following. 50 parts by weight of a styrene monomer was used, and after (first) polymerization at 135° C. using 0.19 parts by weight of dicumyl peroxide as the initiator, the temperature of the reaction system was lowered to 125° C. 0.30 parts by weight of dicumyl peroxide as a polymerization initiator was dissolved in 350 parts by weight of a styrene monomer to prepare a second styrene monomer. The second styrene monomer was continuously dropped into the reaction solution of the first polymerization at a rate of 50 parts by weight per hour so that (second) polymerization of the second styrene monomer took place while the resin beads were impregnated with the second styrene monomer. Then, expandable beads were obtained in the same manner as in example 1.

The dispersion states of styrene resin in the obtained modified resin beads and expandable beads were observed by the TEM. The styrene resin was dispersed in the form of particles, and a diameter of particle was 0.03 μm to 0.3 μm in surface regions (areas within about 5 μm from the surfaces) and the styrene resin was dispersed in the form of particles, and a diameter of particle was 0.08 μm to 0.4 μm in center regions (areas within about a 5 μm radius from the centers).

The expandable beads were pre-expanded in the same manner as in Example 1 to obtain pre-expanded beads. Then, the pre-expanded beads were subjected to molding in the same manner as in Example 1 to provide an expanded molded article.

The obtained expanded molded article has voids. The void percentage, bending strength, sound absorption coefficient and chemical resistance of the obtained expanded molded article were measured. The results are shown in Table 1.

Example 11

Modified resin beads were obtained in the same manner as in Example 10, and 14 parts by weight of pentane (n-pentane: isopentane=80:20, volume ratio) was added instead of butane as the blowing agent. Then, the temperature inside the rotary mixer was raised to 30° C. and kept for 6 hours. Then, the temperature was cooled to 25° C. to obtain expandable beads.

The dispersion states of styrene resin in the obtained modified resin beads and expandable beads were observed by the TEM. The styrene resin was dispersed in the form of particles, and a diameter of particle was 0.03 μm to 0.3 μm in surface regions (areas within about 5 μm from the surfaces) and the styrene resin was dispersed in the form of particles, and a diameter of particle was 0.08 μm to 0.4 μm in center regions (areas within about a 5 μm radius from the centers).

The expandable beads were pre-expanded in the same manner as in Example 1 to obtain pre-expanded beads. Then, the pre-expanded beads were subjected to molding in the same manner as in Example 1 to provide an expanded molded article.

The obtained expanded molded article has voids. The void percentage, bending strength, sound absorption coefficient and chemical resistance of the obtained expanded molded article were measured. The results are shown in Table 1.

Comparative Example 1

Modified resin beads and expandable beads were obtained in the same manner as in Example 1 except that trade name "TUF-2032" manufactured by Nippon Unicar Company Limited (crystallization peak temperature: 113° C., melt flow rate: 0.9 g/10 min., density: 0.923 g/cm³, molecular weight distribution (Mw/Mn): 4.5) was used as the linear low-density polyethylene-based resin (LLDPE) prepared by using a Ziegler-Natta catalyst, the polymerization temperature was 119° C. and the amount of styrene monomer added was 185 parts by weight.

Figure 6:
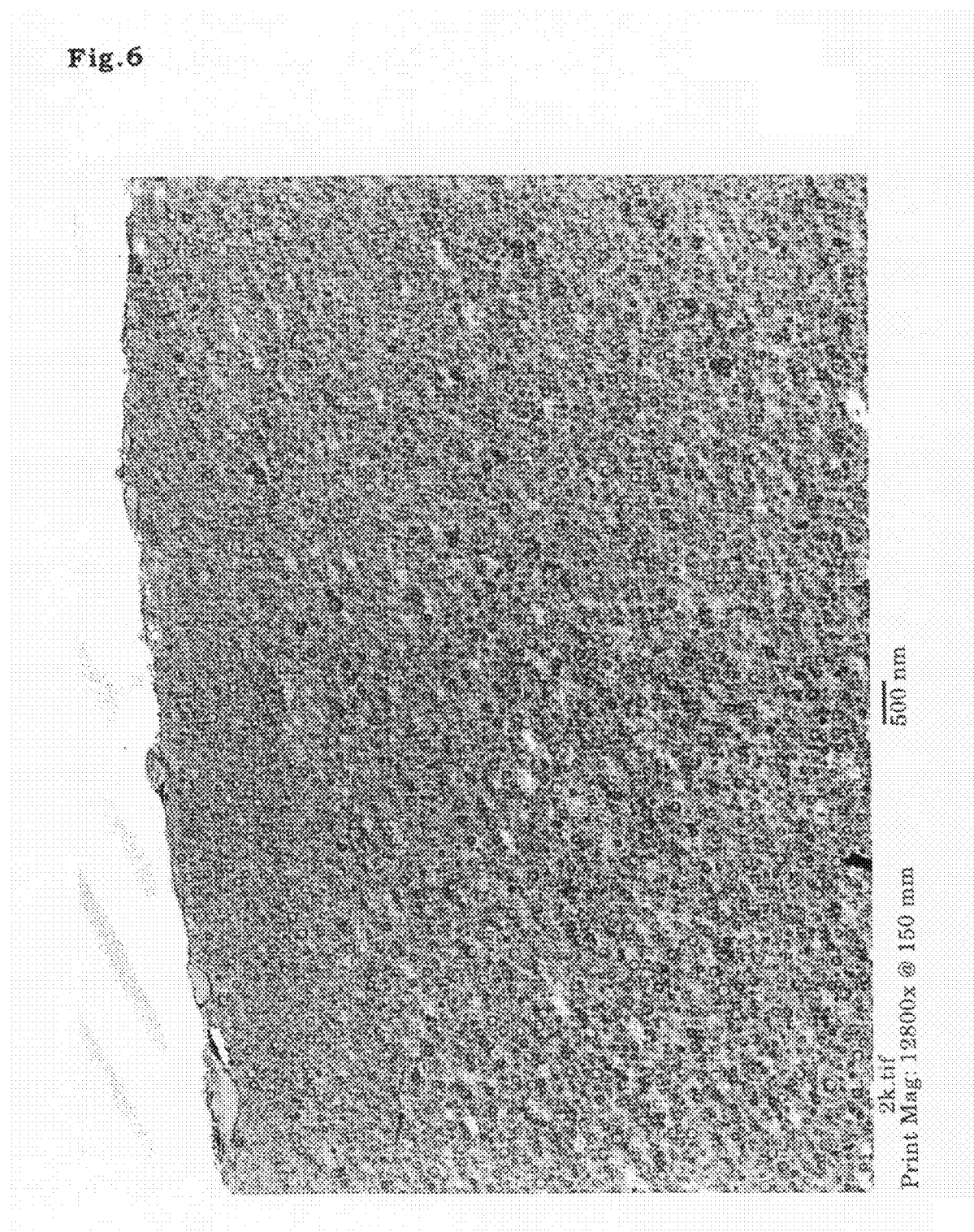
FIG. 6 is a TEM picture showing a surface region cross-section of a modified resin bead according to Comparative Example 1.
Figure 7:
FIG. 7 is a TEM picture showing a center region cross-section of the modified resin bead according to Comparative Example 1.

The dispersion states of styrene resin in the obtained modified resin beads and expandable beads were observed by the TEM. The styrene resin was dispersed in the form of particles, and a diameter of particle was 0.05 μm to 0.15 μm in surface regions (×12,800, areas within about 5 μm from the surfaces), but dispersion of the styrene resin particles was not observed and the styrene resin particles was the continuous phase in center regions (×12,800, areas within about a 5 μm radius from the centers). The cross-sectional pictures of the surface region and center region of the modified resin bead are shown in FIG. 6 and FIG. 7, respectively.

The expandable beads were pre-expanded in the same manner as in Example 1 to obtain pre-expanded beads. Then, the pre-expanded beads were subjected to molding in the same manner as in Example 1 to provide an expanded molded article.

The expanded molded article having voids was obtained. However, the molded article was poor in bending strength as compared to the molded article obtained in Example 1. The void percentage, bending strength, sound absorption coefficient and chemical resistance of the obtained expanded molded article were measured. The results are shown in Table 2.

Comparative Example 2

100 parts by weight of an ethylene/vinyl acetate copolymer (hereinafter referred to as EVA, manufactured by Nippon Unicar Company Limited, tradename: NUC-3221, vinyl acetate content: 5 wt %, melting point: 107° C., melt flow rate: 0.2 g/10 min., density: 0.92 g/cm³) and 0.5 parts by weight of synthetic water-containing silicon dioxide were fed to an extruder. The feedstock was melted and kneaded, and then granulated by under water cut system to provide oval (egg-shaped) EVA resin beads. The average weight of the EVA resin beads was 0.6 mg.

Then, 0.8 parts by weight of magnesium pyrophosphate and 0.02 parts by weight of sodium dodecylbenzenesulfonate were dispersed in 100 parts by weight of water to obtain a medium for dispersion.

In the dispersion medium, 100.5 parts by weight of the EVA resin beads containing synthetic water-containing silicon dioxide were dispersed to obtain a suspension.

Furthermore, 0.19 parts by weight of dicumyl peroxide as a polymerization initiator was dissolved in advance in 40 parts by weight of a styrene monomer to prepare a first styrene monomer.

The temperature of the water-based medium containing the EVA resin beads was adjusted to 60° C. and the styrene monomer was added quantitatively to the medium over 30 min. Then, the resulting mixture was stirred for an hour to impregnate the EVA resin beads with the styrene monomer.

Next, the temperature of the reaction system was raised to 85° C. and kept for 2 hours to polymerize (first polymerization) the first styrene monomer in the EVA resin beads.

Subsequently, 0.19 parts by weight of dicumyl peroxide as a polymerization initiator was dissolved in 240 parts by weight of a styrene monomer to obtain a second styrene monomer. The second styrene monomer was dropped continuously into the reaction solution of the first polymerization at a rate of 50 parts by weight per hour, so that the second styrene monomer was polymerized (second polymerization) while the EVA resin beads were impregnated with the monomer.

Figure 8:
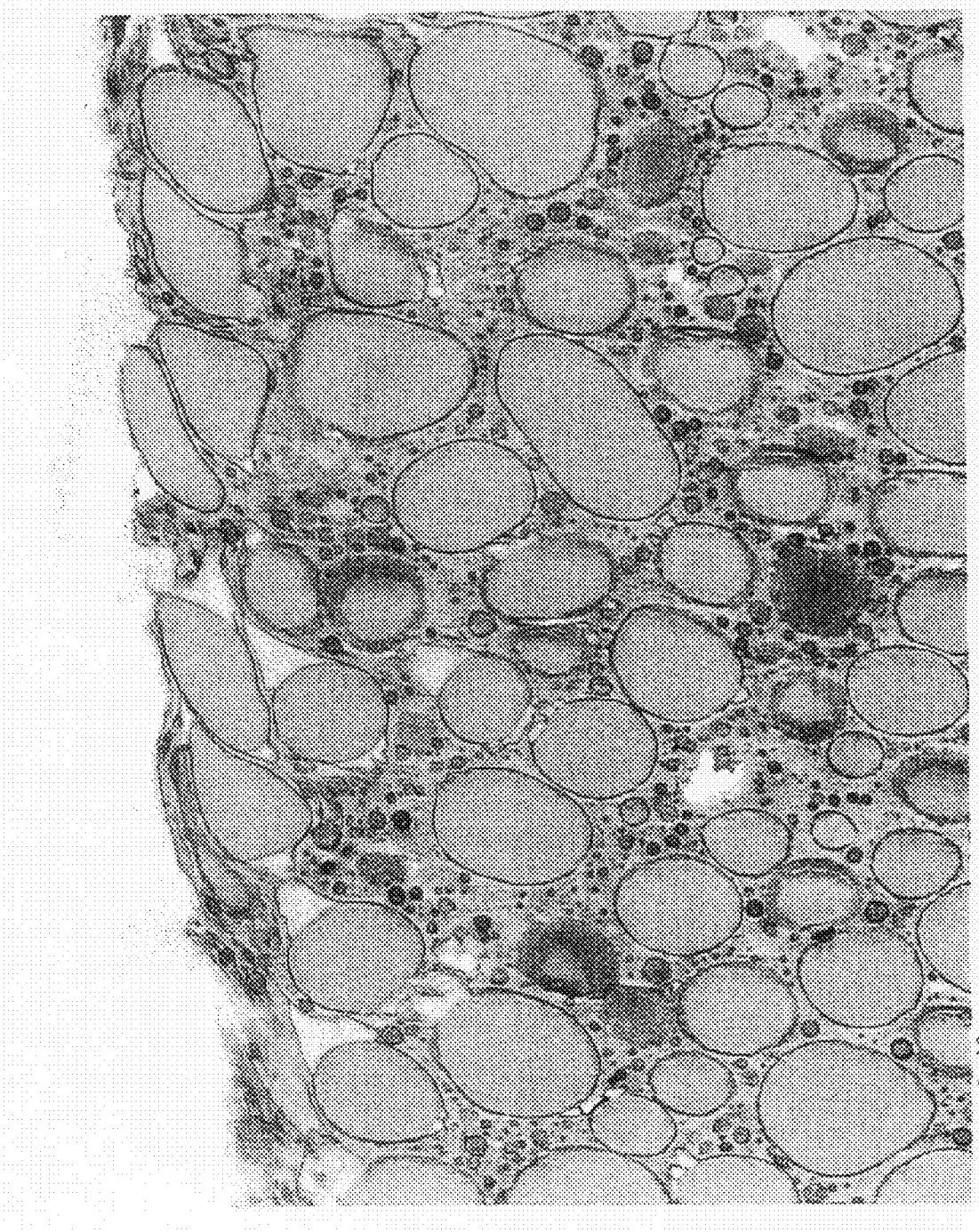
FIG. 8 is a TEM picture showing a surface region cross-section of a modified resin bead according to Comparative Example 2.
Figure 9:
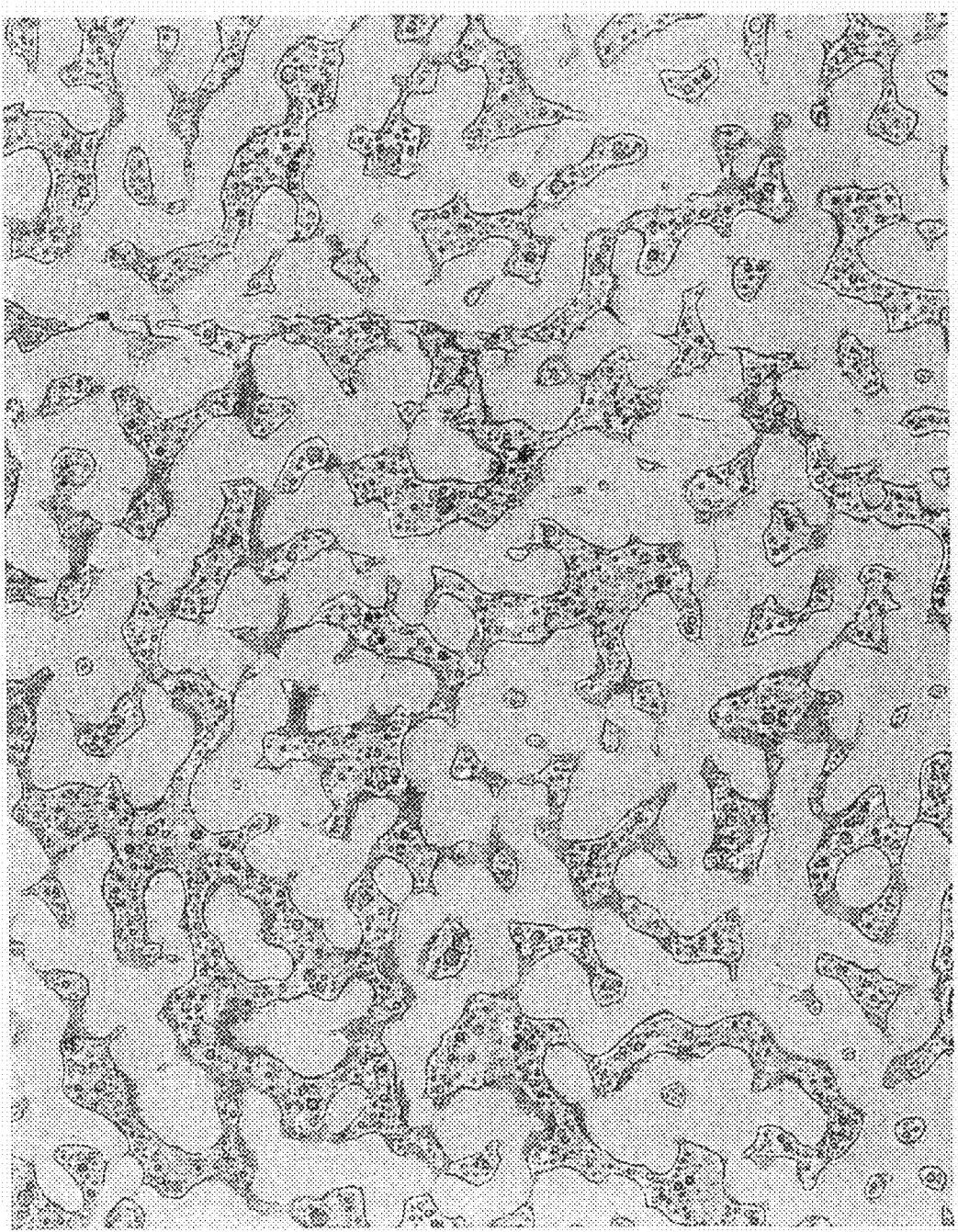
FIG. 9 is a TEM picture showing a center region cross-section of the modified resin bead according to Comparative Example 2.

The dispersion state of the styrene resin in the obtained modified resin beads was observed by the TEM (×22500 in a surface area, ×12800 in a center region). The styrene resin was dispersed in the form of particles, and a diameter of particle was greater than 1 μm in the surface region (an area within about 5 μm from the surface), and in the center region (an area within about 5 μm radius from the center), the styrene resin particles were not observed in particulate form and instead, were in a continuous state. The cross-sectional pictures of the surface region and the center region are shown in FIG. 8 and FIG. 9, respectively.

Then, expandable beads were obtained in the same manner as in Example 1. The obtained expandable beads had the styrene resin dispersed in the form of particles, and a diameter of particle was greater than 1 μm in a surface region as in the case of the above modified resin beads. In a center region, the styrene resin particles were not observed in particulate form and instead, were in a continuous state.

The expandable beads were pre-expanded in the same manner as in Example 1 to obtain pre-expanded beads. Then, the pre-expanded beads were subjected to molding in the same manner as in Example 1 to provide an expanded molded article.

The expanded molded article having voids was obtained. However, the molded article was poor in chemical resistance and bending strength as compared to the molded article obtained in Example 1. The void percentage, bending strength, sound absorption coefficient and chemical resistance of the obtained expanded molded article were measured. The results are shown in Table 2.

Comparative Example 3

Modified resin beads and expandable beads were obtained in the same manner as in Example 1 except that the amount of styrene-based monomer used was 10 parts by weight.

The dispersion states of styrene resin in the obtained modified resin beads and expandable beads were observed by the TEM. The styrene resin in particulate form was hardly observed in surface regions (areas within about 5 μm from the surfaces) and styrene resin in particulate form was not observed in center regions (areas within about a 5 μm radius from the centers) as well.

Next, the obtained expandable beads were immediately fed to a pre-expanding machine and steam were introduced at a pressure of 0.02 MPa to pre-expand the beads. The beads, however, hardly expanded and pre-expanded beads that can be adapted for molding could not be obtained.

Comparative Example 4

Resin beads were obtained in the same manner as in Example 1 except that the amount of the initiator used was 1.0 parts by weight. The obtained resin beads contained a large amount of fine powder other than the modified resin beads. The fine powder was styrene resin powder and it was generated due to the styrene monomer being polymerized before the impregnation of the inside of the resin beads with the monomer. For this reason, the polyethylene-based resin could not be modified with a desired amount of the styrene resin. An expanded molded article for the evaluation of physical properties could not be obtained since the fine particles hindered the fusion of the expanded beads at the molding.

Comparative Example 5

Modified resin beads were obtained in the same manner as in Example 7 except that benzoyl peroxide was used as the initiator and the polymerization temperature was 90° C. in the first polymerization and dicumyl peroxide was used as the initiator and the polymerization temperature was 130° C. in the second polymerization. Then, expandable beads were obtained in the same manner as in Example 1.

The dispersion states of styrene resin in the obtained modified resin beads and expandable beads were observed by the TEM. The styrene resin was dispersed in the form of particles, and a diameter of particle was greater than 1 μm in surface regions (areas within 5 μm from the surfaces) and center regions (areas within about a 5 μm radius from the centers).

The expandable beads were pre-expanded in the same manner as in Example 1 to obtain pre-expanded beads. Then, the pre-expanded beads were subjected to molding in the same manner as in Example 1 to provide an expanded molded article.

The expanded molded article having voids was obtained. However, the molded article was poor in chemical resistance and bending strength as compared to the molded article obtained in Example 1. The void percentage, bending strength, sound absorption coefficient and chemical resistance of the obtained expanded molded article were measured. The results are shown in Table 2.

Comparative Example 6

Modified resin beads and expandable beads were obtained in the same manner as in Example 1 except that benzoyl peroxide was used as the initiator and the polymerization temperature was 90° C.

The dispersion states of styrene resin in the obtained modified resin beads and expandable beads were observed by the TEM. The styrene resin was dispersed in the form of particles, and a diameter of particle was greater than 1 μm in surface regions (areas within 5 μm from the surface). A part of the styrene resin was in a continuous state in center regions (areas within about a 5 μm radius from the centers).

The expandable beads were pre-expanded in the same manner as in Example 1 to obtain pre-expanded beads. Then, the pre-expanded beads were subjected to molding in the same manner as in Example 1 to provide an expanded molded article.

The expanded molded article having voids was obtained. However, the molded article was poor in chemical resistance and bending strength as compared to the molded article obtained in Example 1. The void percentage, bending strength, sound absorption coefficient and chemical resistance of the obtained expanded molded article were measured. The results are shown in Table 2.

Comparative Example 7

Modified resin beads were obtained in the same manner as in Example 7 except that dicumyl peroxide was used as the initiator and the polymerization temperature was 130° C. in the first polymerization and benzoyl peroxide was used as the initiator and the polymerization temperature was 90° C. in the second polymerization. Then, expandable beads were obtained in the same manner as in Example 1.

The dispersion states of styrene resin in the obtained modified resin beads and expandable beads were observed by the TEM. The styrene resin was dispersed in the form of particles, and a diameter of particle was greater than 1 μm in surface regions (areas within 5 μm from the surfaces). The styrene resin was in a continuous state in center regions (areas within about a 5 μm radius from the centers).

The expandable beads were pre-expanded in the same manner as in Example 1 to obtain pre-expanded beads. Then, the pre-expanded beads were subjected to molding in the same manner as in Example 1 to provide an expanded molded article.

The expanded molded article having voids was obtained. However, the molded article was poor in chemical resistance and bending strength as compared to the molded article obtained in Example 1. The void percentage, bending strength, sound absorption coefficient and chemical resistance of the obtained expanded molded article were measured. The results are shown in Table 2.

Comparative Example 8

Expandable beads were prepared in the same manner as in Example 1 using the modified resin beads obtained in Example 10 the expandable beads were pre-expanded in the same manner as in Example 1 to obtain pre-expanded beads. Then, the pre-expanded beads were filled into a mold of a molding machine, and using steam at a pressure of 0.08 MPa, (1) mold heating for 7 seconds, (2) one-side heating for 15 seconds, (3) other-side heating for 2 seconds and (4) both-side heating for 10 seconds were sequentially performed. After the heating, the mold was water-cooled to obtain an expanded molded article.

Since the obtained expanded molded article had smaller voids, the sound absorption coefficient thereof was poor as compared to the molded article obtained in Example 1. The void percentage, bending strength, sound absorption coefficient and chemical resistance of the obtained expanded molded article were measured. The results are shown in Table 2.

Comparative Example 9

Modified resin beads were obtained in the same manner as in Example 2 except that the amount of the second styrene monomer was 834 parts by weight and it was dropped continuously into the reaction solution of the first polymerization over 10 hours. Then, expandable beads were obtained in the same manner as in Example 1.

Figure 10:
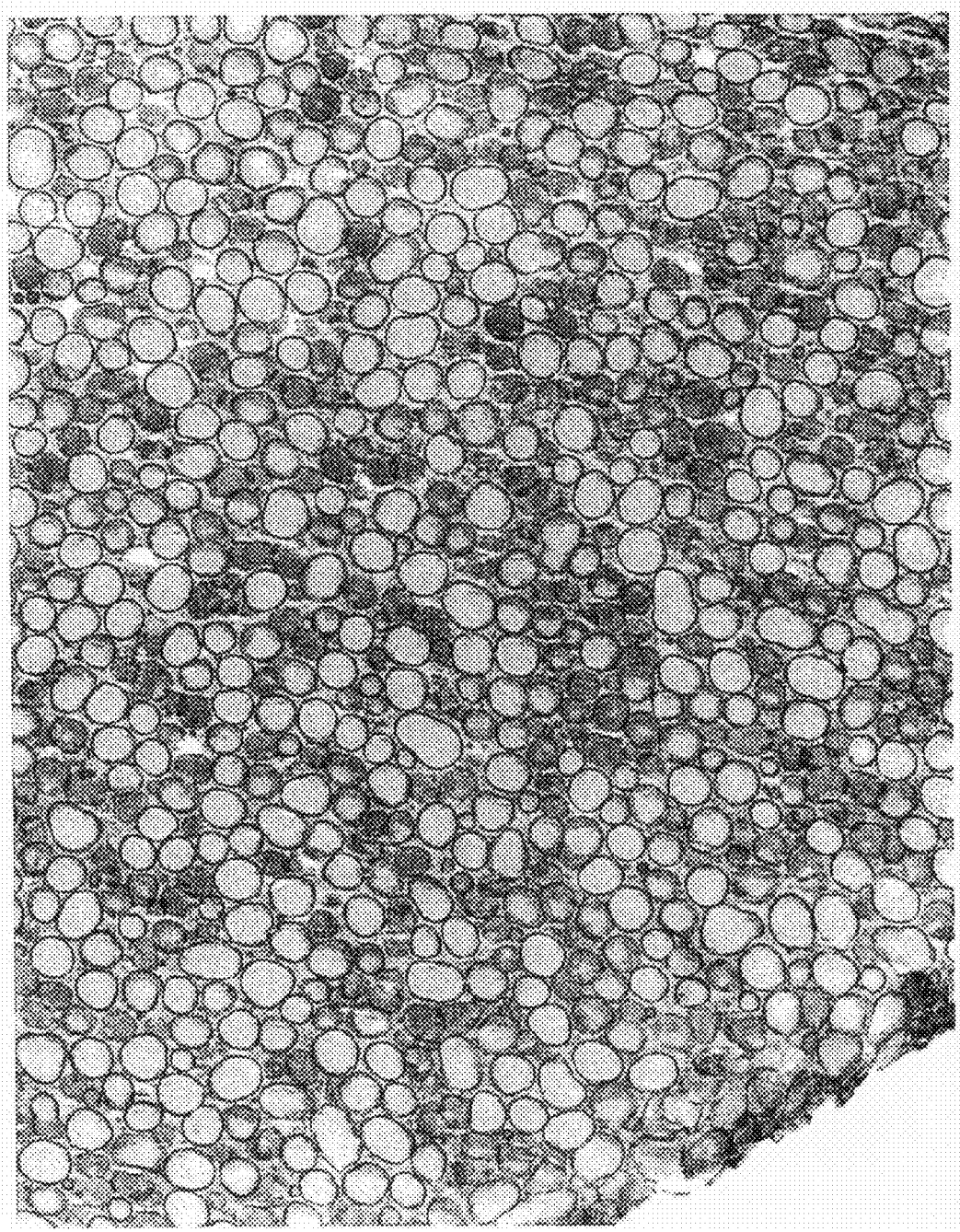
FIG. 10 is a TEM picture showing a surface region cross-section of a modified resin bead according to Comparative Example 9.
Figure 11:
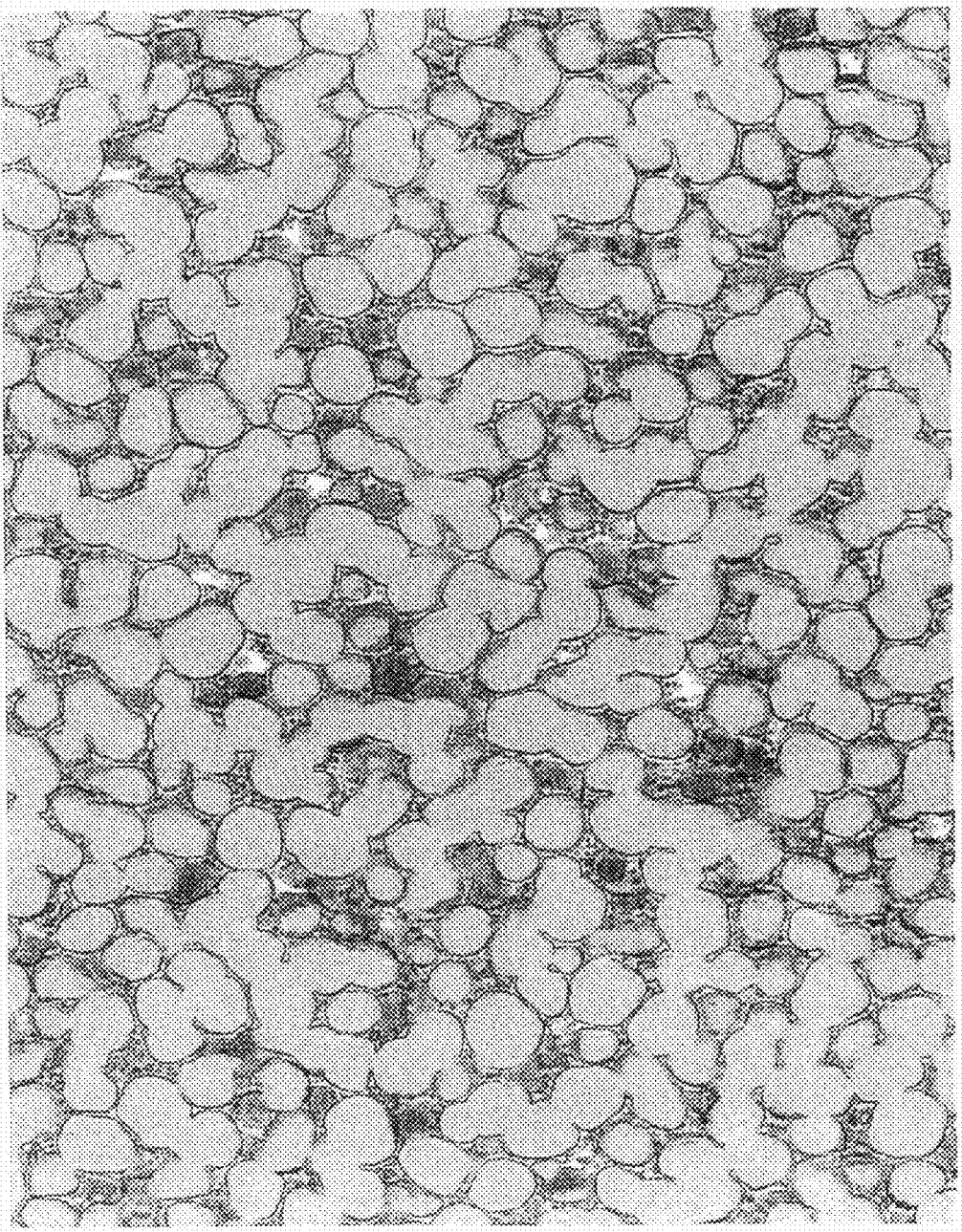
FIG. 11 is a TEM picture showing a center region cross-section of the modified resin bead according to Comparative Example 9.

The dispersion states of styrene resin in the obtained modified resin beads and expandable beads were observed by the TEM. The styrene resin was dispersed in the form of particles, and a diameter of particle was 0.07 μm to 0.4 μm in surface regions (×19,300, areas within about 5 μm from the surfaces), but in center regions (×19,300, areas within about a 5 μm radius from the centers) the particulate styrene resin formed a continuous phase and as a result, the styrene resin particles had a particle diameter greater than 0.8 μm. The cross-sectional pictures of the surface region and the center region are shown in FIG. 10 and FIG. 11, respectively.

The obtained expandable beads were immediately pre-expanded using steam to a bulk density of 20 kg/m$^3$ so that pre-expanded beads were obtained. Then, the pre-expanded beads were filled in a mold of a molding machine, and using steam at a pressure of 0.08 MPa, (1) mold heating for 5 seconds, (2) one-side heating for 12 seconds, (3) other-side heating for 0.5 seconds and (4) both-side heating for 0.5 seconds were sequentially performed. After the heating, the mold was water-cooled to obtain an expanded molded article.

The same molding machine as in Example 1 was used.

The expanded molded article having voids was obtained. However, the molded article was poor in bending strength as compared to the molded article obtained in Example 1. The void percentage, bending strength, sound absorption coefficient and chemical resistance of the obtained expanded molded article were measured. The results are shown in Table 2.

TABLE 1

|  |  | Examples | | | | | |
|---|---|---|---|---|---|---|---|
|  |  | 1 | 2 | 3 | 4 | 5 | 6 |
| Conditions | PE Resin (pbw) | FMRN-063 100 | FMRN-063 100 | Evolue-201 100 | FMRN-063 100 | FMRN-063 100 | FMRN-063 100 |
|  | Coloring Agent (pbw) |  |  |  | Iron Oxide 25 | CB 3 |  |
|  | Crz. Peak Temp. (° C.) | 101 | 101 | 108 | 101 | 101 | 101 |
|  | Inorg. Nucleating Agent (pbw) | Talc 0.5 | Talc 0.5 | Talc 0.5 | Talc 0.5 | Talc 0.5 | Talc 0.5 |
|  | 1$^{st}$. Styrene-based Monomer (pbw) | SM 100 | SM 66 | SM 66 | SM 66 | SM 66 | SM + αMSM 95 + 5 |
|  | 2$^{nd}$. Styrene-based Monomer (pbw) |  | SM 534 | SM 534 | SM 534 | SM 534 |  |
|  | 1$^{st}$. Polym. Temp. (° C.) | 130 | 130 | 130 | 130 | 130 | 130 |
|  | 2$^{nd}$. Polym. Temp. (° C.) |  | 130 | 130 | 130 | 130 |  |
|  | (1$^{st}$.) Polym. Initiator (pbw) | 0.19 | 0.19 | 0.19 | 0.19 | 0.19 | 0.19 |
|  | (2$^{nd}$.) Polym. Initiator (pbw) |  | 0.30 | 0.30 | 0.30 | 0.30 |  |
|  | Blowing Agent | Butane | Butane | Butane | Butane | Butane | Butane |
|  | Bulk Density (kg/cm$^3$) | 30 | 30 | 30 | 30 | 30 | 30 |
|  | Void percentage(%) | 20 | 20 | 9 | 20 | 20 | 20 |
|  | Bending Strength (MPa) | 0.40 | 0.38 | 0.52 | 0.30 | 0.35 | 0.40 |
|  | Sound absorption coefficient | 0.85 | 0.80 | 0.60 | 0.80 | 0.80 | 0.80 |

TABLE 1-continued

| | | | | | | | |
|---|---|---|---|---|---|---|---|
| Chemical Resistance | Gasoline | ○ | ○ | ○ | ○ | ○ | ○ |
| | Kerosene | ○ | ○ | ○ | ○ | ○ | ○ |
| | DBP | ○ | ○ | ○ | ○ | ○ | ○ |

| | | Examples | | | | |
|---|---|---|---|---|---|---|
| | | 7 | 8 | 9 | 10 | 11 |
| Conditions | PE Resin (pbw) | FMRN-063 100 | FMRN-063 100 | FMRN-063 100 | FMRN-063 100 | FMRN-063 100 |
| | Coloring Agent (pbw) | | | | | |
| | Crz. Peak Temp. (° C.) | 101 | 101 | 101 | 101 | 101 |
| | Inorg. Nucleating Agent (pbw) | Talc 0.5 | Silica 0.5 | Talc 0.5 | Talc 0.5 | Talc 0.5 |
| | $1^{st}$. Styrene-based Monomer (pbw) | SM 50 | SM 50 | SM 120 | SM 50 | SM 50 |
| | $2^{nd}$. Styrene-based Monomer (pbw) | SM 350 | SM 350 | SM 80 | SM 350 | SM 350 |
| | $1^{st}$. Polym. Temp. (° C.) | 115 | 140 | 130 | 135 | 135 |
| | $2^{nd}$. Polym. Temp. (° C.) | 115 | 140 | 130 | 125 | 125 |
| | ($1^{st}$.) Polym. Initiator (pbw) | 0.19 | 0.19 | 0.19 | 0.19 | 0.19 |
| | ($2^{nd}$.) Polym. Initiator (pbw) | 0.30 | 0.30 | 0.30 | 0.30 | 0.30 |
| Blowing Agent | | Butane | Butane | Butane | Butane | Pentane |
| Bulk Density (kg/cm³) | | 30 | 30 | 30 | 30 | 30 |
| Void percentage(%) | | 20 | 25 | 20 | 20 | 20 |
| Bending Strength (MPa) | | 0.39 | 0.35 | 0.37 | 0.38 | 0.38 |
| Sound absorption coefficient | | 0.80 | 0.85 | 0.80 | 0.80 | 0.80 |
| Chemical Resistance | Gasoline | ○ | ○ | ○ | ○ | ○ |
| | Kerosene | ○ | ○ | ○ | ○ | ○ |
| | DBP | ○ | ○ | ○ | ○ | ○ | pbw: parts by weight
crz: crstallization

TABLE 2

| | | Comp. Example | | | | | | | | |
|---|---|---|---|---|---|---|---|---|---|---|
| | | 1 | 2 | 3 | 4 | 5 | 6 | 7 | 8 | 9 |
| Conditions | PE Resin (pbw) | TUF-2032 100 | EVA 100 | FMRN-063 100 | FMRN-063 100 | FMRN-063 100 | FMRN-063 100 | FMRN-063 100 | FMRN-063 100 | FMRN-063 100 |
| | Crz. Peak Temp. (° C.) | 113 | | 101 | 101 | 101 | 101 | 101 | 101 | 101 |
| | Inorg. Nucleating Agent (pbw) | Talc 0.5 | Talc 0.5 | Talc 0.5 | Talc 0.5 | Talc 0.5 | Talc 0.5 | Talc 0.5 | Talc 0.5 | Talc 0.5 |
| | $1^{st}$. Styrene-based Monomer (pbw) | SM 185 | SM 40 | SM 10 | SM 100 | SM 50 | SM 100 | SM 50 | SM 50 | SM 66 |
| | $2^{nd}$. Styrene-based Monomer (pbw) | | SM 240 | | | SM 350 | | SM 350 | SM 350 | SM 834 |
| | $1^{st}$. Polym. Temp. (° C.) | 119 | 85 | 130 | 130 | 90 | 90 | 130 | 135 | 130 |
| | $2^{nd}$. Polym. Temp. (° C.) | | 85 | | | 130 | | 90 | 125 | 130 |
| | ($1^{st}$.) Polym. Initiator (pbw) | 0.19 | 0.19 | 0.19 | 1.0 | 0.19 | 0.19 | 0.19 | 0.19 | 0.19 |
| | ($2^{nd}$.) Polym. Initiator (pbw) | | 0.19 | | | 0.30 | | 0.30 | 0.30 | 0.30 |
| Blowing Agent | | Butane | Butane | Butane | Butane | Butane | Butane | Butane | Butane | Butane |
| Bulk Density (kg/cm³) | | 30 | 30 | | | 30 | 30 | 30 | 30 | 20 |
| Void percentage (%) | | 20 | 20 | | | 20 | 20 | 20 | 2 | 20 |
| Bending Strength (MPa) | | 0.25 | 0.18 | | | 0.22 | 0.15 | 0.22 | 0.62 | 0.25 |
| Sound absorption coefficient | | 0.80 | 0.75 | | | 0.75 | 0.75 | 0.75 | 0.20 | 0.75 |
| Chemical Resistance | Gasoline | ○ | X | | | X | X | △ | ○ | ○ |
| | Kerosene | ○ | △ | | | △ | △ | △ | ○ | ○ |
| | DBP | ○ | ○ | | | △ | △ | △ | ○ | ○ | pbw: parts by weight
crz: crstallization

In Tables 1 and 2, PE refers to polyethylene, SM refers to a styrene monomer and αMSM refers to an α-methylstyrene monomer.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

Furthermore, the present invention is related to Japanese Patent Application No. 2004-275278 filed on Sep. 22, 2004, whose priory is claimed and the disclosure of which is incorporated by reference in its entirety.

The invention claimed is:

1. An expanded molded article having a void percentage of 5 to 50%, a bending strength of 0.3 MPa or greater, and a sound absorption coefficient more than 0.6, the molded article comprising 50 to 800 parts by weight of styrene-based resin relative to 100 parts by weight of non-crosslinked linear low-density polyethylene-based resin which can be obtained by using a metallocene catalyst, wherein the polyethylene-based resin has a molecular weight distribution (Mw/Mn) of 1.5 to 3.5 measured by Gel Permeation Chromatography, wherein the molded article is obtained by impregnating styrene-modified linear low-density polyethylene-based resin beads with a volatile blowing agent to provide expandable beads, pre-expanding the expandable beads and then subjecting the obtained pre-expanded beads to expansion molding, the styrene-modified linear low-density polyethylene-based resin beads each have the styrene-based resin dispersed in the form of particles, and a diameter of particle is 0.8 μm or smaller in a surface region within at least 5 μm from the bead surface and in a center region within a 5 μm radius from the bead center.

2. The expanded molded article of claim 1 for use as a material for automobile interior, automobile parts and construction parts.

* * * * *